(12) United States Patent
Hua et al.

(10) Patent No.: US 7,424,826 B2
(45) Date of Patent: Sep. 16, 2008

(54) SINGLE CHIP TRI-AXIS ACCELEROMETER

(75) Inventors: Yaping Hua, Wuxi (CN); Leyue Jiang, Wuxi (CN); Yongyao Cai, Acton, MA (US); Albert Leung, Burnaby (CA); Yang Zhao, Andover, MA (US)

(73) Assignee: Memsic, Inc., N. Andover, MA (US)

( * ) Notice: Subject to any disclaimer, the term of this patent is extended or adjusted under 35 U.S.C. 154(b) by 378 days.

(21) Appl. No.: 11/271,035

(22) Filed: Nov. 10, 2005

(65) Prior Publication Data

US 2007/0101813 A1    May 10, 2007

(51) Int. Cl.
*G01P 15/00* (2006.01)
(52) U.S. Cl. .................. 73/514.05; 73/514.16; 73/488; 73/514.09
(58) Field of Classification Search ............... 73/514.05, 73/514.06, 204.13, 204.12
See application file for complete search history.

(56) References Cited

U.S. PATENT DOCUMENTS

| 6,182,509 B1 | 2/2001 | Leung ................... 73/514.05 |
| 6,589,433 B2 | 7/2003 | Leung ........................... 216/2 |
| 6,666,088 B2 * | 12/2003 | Leung .......................... 73/488 |
| 2006/0179940 A1 * | 8/2006 | Liu et al. ..................... 73/488 |

* cited by examiner

*Primary Examiner*—Hezron E. Williams
*Assistant Examiner*—Mark Shabman
(74) *Attorney, Agent, or Firm*—Weingarten, Schurgin, Gagnebin & Lebovici LLP

(57) ABSTRACT

Single chip 3-axis thermal accelerometer devices include a substrate, at least one cavity etched in the substrate, a fluid disposed in the cavity, a bridge structure suspended over an opening of the cavity, and a plurality of heater elements and temperature sensing elements disposed on the bridge structure. The substrate has a substantially planar surface defined by X and Y coordinate axes, and the bridge structure is suspended over the opening of the cavity in the X-Y plane. In one embodiment, the bridge structure is configured to position at least two of the temperature sensing elements out of the X-Y plane. The heater and temperature sensing elements are disposed on the bridge structure in optimized arrangements for providing reduced temperature coefficients and for producing output voltages having reduced DC offset and drift.

33 Claims, 14 Drawing Sheets

SINGLE CHIP TRI-AXIS ACCELEROMETER

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates generally to micro-machined convective accelerometers, and more specifically to multiple axis thermal accelerometers capable of being formed on a single chip.

U.S. patent application Ser. No. 11/125,759 filed May 10, 2005 entitled Z-AXIS THERMAL ACCELEROMETER and assigned to the same assignee of the present invention (the '759 application) discloses a thermal accelerometer that allows up to three axes of acceleration sensing. The disclosed thermal accelerometer comprises a thermal acceleration sensor including a substrate having a substantially planar surface defined by X and Y coordinate axes, at least one cavity formed in the substrate, at least one heater element, first and second temperature sensing elements, and an internal reference voltage. The heater element is suspended over the cavity in the X-Y plane, and the first and second temperature sensing elements are disposed along either the X-axis or the Y-axis on opposite sides of and at substantially equal distances from the heater element. The thermal accelerometer further includes amplification circuitry operative to receive signals representing a differential temperature detected by the first and second temperature sensing elements, in which the differential temperature is indicative of a sensed acceleration along the X or Y-axis. The amplification circuitry is also operative to receive signals representing a common mode temperature detected by the first and second temperature sensing elements, in which the common mode temperature is indicative of a sensed acceleration along the Z-axis. The amplification circuitry produces output voltages representative of the magnitudes of acceleration in the X, Y, and Z directions. As disclosed in the '759 application, the thermal accelerometer may be implemented using fabrication techniques that are compatible with CMOS and bipolar processes.

Although the thermal accelerometer disclosed in the '759 application can be successfully employed to obtain up to three axes of acceleration sensing, there is an increasing need for single chip multiple axis thermal accelerometers that provide enhanced performance over existing multi-axis thermal accelerometer devices. Such enhanced thermal accelerometer devices would include thermal acceleration sensors having reduced temperature coefficients, and would produce output voltages exhibiting reduced DC offset and drift. Heretofore, the increasing need for single chip multiple axis thermal accelerometers enhanced for higher performance has not been fully met. It would be-desirable to have single chip multi-axis thermal accelerometers that address this requirement.

BRIEF SUMMARY OF THE INVENTION

In accordance with the present invention, single chip multiple axis thermal accelerometers are disclosed that provide enhanced performance over conventional multi-axis thermal accelerometer devices.

In one embodiment, a single chip 3-axis thermal accelerometer device includes a substrate, at least one cavity etched in the substrate, a fluid disposed in the cavity, a bridge structure suspended over an opening of the cavity, and a plurality of heater elements and a plurality of temperature sensing elements disposed on the bridge structure. The substrate has a substantially planar surface defined by the X and Y coordinate axes, and the bridge structure is suspended over the opening of the cavity in the X-Y plane. In this first embodiment, the respective pluralities of heater elements and temperature sensing elements are arranged on the bridge structure in a plurality of groups, in which each group includes two temperature sensing elements and a single heater element. A first group and a second group of heater and temperature sensing elements are disposed along the X-axis on opposite sides of and at substantially equal distances from the center of the cavity opening, and a third group and a fourth group of heater and temperature sensing elements are disposed along the Y-axis on opposite sides of and at substantially equal distances from the center of the cavity opening. Within each group of heater and temperature sensing elements, the two temperature sensing elements are disposed along the X-axis or the Y-axis on opposite sides of and at substantially equal distances from the respective heater element.

When accelerating forces are applied to the thermal accelerometer device, the temperature distribution of the fluid within the device cavity shifts. In this first embodiment, to obtain an indication of the magnitude of acceleration along the X-axis, the differential temperatures detected by the temperature sensing elements within each of the first and second groups are determined in the same direction along the X-axis. Next, signals representing these differential temperatures along the X-axis are generated, and the signal magnitudes are determined and summed. Similarly, to obtain an indication of the magnitude of acceleration along the Y-axis, the differential temperatures detected by the temperature sensing elements within each of the third and fourth groups are determined in the same direction along the Y-axis. Signals representing these differential temperatures along the Y-axis are then generated, and the signal magnitudes are determined and summed. To obtain an indication of the magnitude of acceleration along the Z-axis, i.e., perpendicular to the X-Y plane, the differential temperatures detected by the temperature sensing elements within each of the first and second groups are determined in opposing directions along the X-axis. Similarly, the differential temperatures detected by the temperature sensing elements within each of the third and fourth groups are determined in opposing directions along the Y-axis. Next, signals representing these differential temperatures along the X and Y-axes are generated, and the signal magnitudes are determined and summed. To increase the sensitivity of acceleration sensing in the Z direction, an additional heater element can be disposed at substantially the center of the cavity opening, and the magnitude of acceleration along the Z-axis can be determined in the same manner as described above. This additional heater element may, however, cause DC offsets to increase.

In another embodiment, a single chip 3-axis thermal accelerometer device includes a substrate, at least one cavity etched in the substrate, a fluid disposed in the cavity, a bridge structure suspended over an opening of the cavity, and a heater element and a plurality of temperature sensing elements disposed on the bridge structure. Like the first embodiment of the thermal accelerometer device described above, the substrate has a substantially planar surface defined by the X and Y coordinate axes, and the bridge structure is suspended over the opening of the cavity in the X-Y plane. In this second embodiment, however, the single heater element is suspended by the bridge structure at substantially the center of the cavity opening. Further, the temperature sensing elements are arranged on the bridge structure such that a first pair of temperature sensing elements are disposed along the X-axis on opposite sides of and at substantially equal distances from the heater element, and a second pair of temperature sensing elements are disposed along the Y-axis on opposite sides of and at substantially equal distances from the heater element. The first and second pairs of temperature sensing elements can be used to obtain indications of the magnitudes of acceleration along the X and Y-axes, respectively. In addition, a third pair of temperature sensing elements are disposed along the X-axis on opposite sides of and at substantially equal distances from the heater element, and a fourth pair of temperature sensing elements are disposed along the Y-axis on opposite sides of and at substantially equal distances from the heater element. Each temperature sensing element within the third and fourth pairs of elements is situated on the bridge structure closer to the heater element than the temperature sensing elements within the first and second pairs of elements. The third and fourth pairs of temperature sensing elements can be used to obtain an indication of the magnitude of acceleration along the Z-axis.

In this second embodiment, to obtain an indication of the magnitude of acceleration along the X-axis, the differential temperature detected by the first pair of temperature sensing elements is determined, a signal representing this differential temperature along the X-axis is generated, and the signal magnitude is determined. Similarly, to obtain an indication of the magnitude of acceleration along the Y-axis, the differential temperature detected by the second pair of temperature sensing elements is determined, a signal representing this differential temperature along the Y-axis is generated, and the signal magnitude is determined. To obtain an indication of the magnitude of acceleration along the Z-axis, the common mode temperature detected by the third and fourth pairs of temperature sensing elements is determined, a signal representing this common mode temperature is generated, and the signal magnitude is determined. Alternatively, the magnitude of the signal representing the common mode temperature detected by the third and fourth pairs of temperature sensing elements can be divided by the sum of the magnitudes of the signals representing the temperatures detected by first and second pairs of temperature sensing elements to obtain an indication of the magnitude of acceleration along the Z-axis with a reduced temperature coefficient.

In still another embodiment, a single chip 3-axis thermal accelerometer device includes a substrate, at least one cavity etched in the substrate, a fluid disposed in the cavity, a bridge structure suspended over an opening of the cavity, and a heater element and a plurality of temperature sensing elements disposed on the bridge structure. As in the second embodiment of the thermal accelerometer device described above, the heater element is suspended by the bridge structure at substantially the center of the cavity opening. Further, the temperature sensing elements are arranged on the bridge structure such that a first pair of temperature sensing elements are disposed along the X-axis on opposite sides of and at substantially equal distances from the heater element, and a second pair of temperature sensing elements are disposed along the Y-axis on opposite sides of and at substantially equal distances from the heater element. In this third embodiment, however, third and fourth pairs of temperature sensing elements are arranged on the bridge structure such that the respective third and fourth pairs of elements are disposed on opposite sides of and at substantially equal distances from the heater element, but out of the X-Y plane. Specifically, the third pair of temperature sensing elements are disposed out of the X-Y plane along a line parallel to the X-axis, and the fourth pair of temperature sensing elements are disposed out of the X-Y plane along a line parallel to the Y-axis. Each temperature sensing element within the third and fourth pairs of elements is situated on the bridge structure closer to the heater element than the temperature sensing elements within the first and second pairs of elements.

In this third embodiment, an indication of the magnitude of acceleration along the X-axis is obtained by determining the differential temperature detected by the first pair of temperature sensing elements, generating a signal representing this differential temperature along the X-axis, and determining the signal magnitude. Similarly, an indication of the magnitude of acceleration along the Y-axis is obtained by determining the differential temperature detected by the second pair of temperature sensing elements, generating a signal representing this differential temperature along the Y-axis, and determining the signal magnitude. An indication of the magnitude of acceleration along the Z-axis can be obtained by determining the common mode temperature detected by the third and fourth pairs of temperature sensing elements, generating a signal representing this common mode temperature, and determining the signal magnitude. Alternatively, the sum of the magnitudes of the signals representing the temperatures detected by the temperature sensing elements within the first and second pairs of elements can be subtracted from the magnitude of the signal representing the common mode temperature detected by the third and fourth pairs of temperature sensing elements to obtain an indication of the magnitude of acceleration along the Z-axis with a reduced DC offset.

In yet another embodiment, a single chip 3-axis thermal accelerometer device includes a substrate, at least one cavity etched in the substrate, a fluid disposed in the cavity, a bridge structure suspended over an opening of the cavity, and a plurality of heater elements, a first temperature sensing element, and a plurality of second temperature sensing elements disposed on the bridge structure. The first temperature sensing element is disposed at substantially the center of the cavity opening. Further, the plurality of second temperature sensing elements and the plurality of heater elements are arranged in a plurality of groups of elements suspended over the cavity in the X-Y plane, in which each group of elements includes at least one second temperature sensing element and at least two heater elements. The two heater elements within each group are disposed between the first temperature sensing element and the second temperature sensing element within the group. The plurality of groups of second temperature sensing elements and heater elements includes first and second groups of elements disposed along the X-axis, and third and fourth groups of elements disposed along the Y-axis. The first and second groups of elements and the third and fourth groups of elements are disposed along the X and Y-axes, respectively, on opposite sides of and at substantially equal distances from the center of the cavity opening.

Other features, functions, and aspects of the invention will be evident from the Detailed Description of the Invention that follows.

BRIEF DESCRIPTION OF THE SEVERAL VIEWS OF THE DRAWINGS

The invention will be more fully understood with reference to the following Detailed Description of the Invention in conjunction with the drawings of which:

FIG. 2b is a cross-sectional view of the single chip 3-axis thermal accelerometer device of FIG. 2a;

FIG. 3b is a cross-sectional view of the single chip 3-axis thermal accelerometer device of FIG. 3a;

FIG. 4b is a cross-sectional view of the single chip 3-axis thermal accelerometer device of FIG. 4a;

DETAILED DESCRIPTION OF THE INVENTION

Single chip 3-axis thermal accelerometers are disclosed that provide enhanced performance over conventional multi-axis thermal accelerometer devices. In one embodiment, the presently disclosed thermal accelerometer devices include thermal acceleration sensors having reduced temperature coefficients. In another embodiment, the disclosed thermal accelerometer devices are capable of producing output voltages that exhibit reduced DC offset and drift. Further embodiments of the single chip 3-axis thermal accelerometers provide increased sensitivity in the direction perpendicular to the plane of the device substrate.

Figure 1:
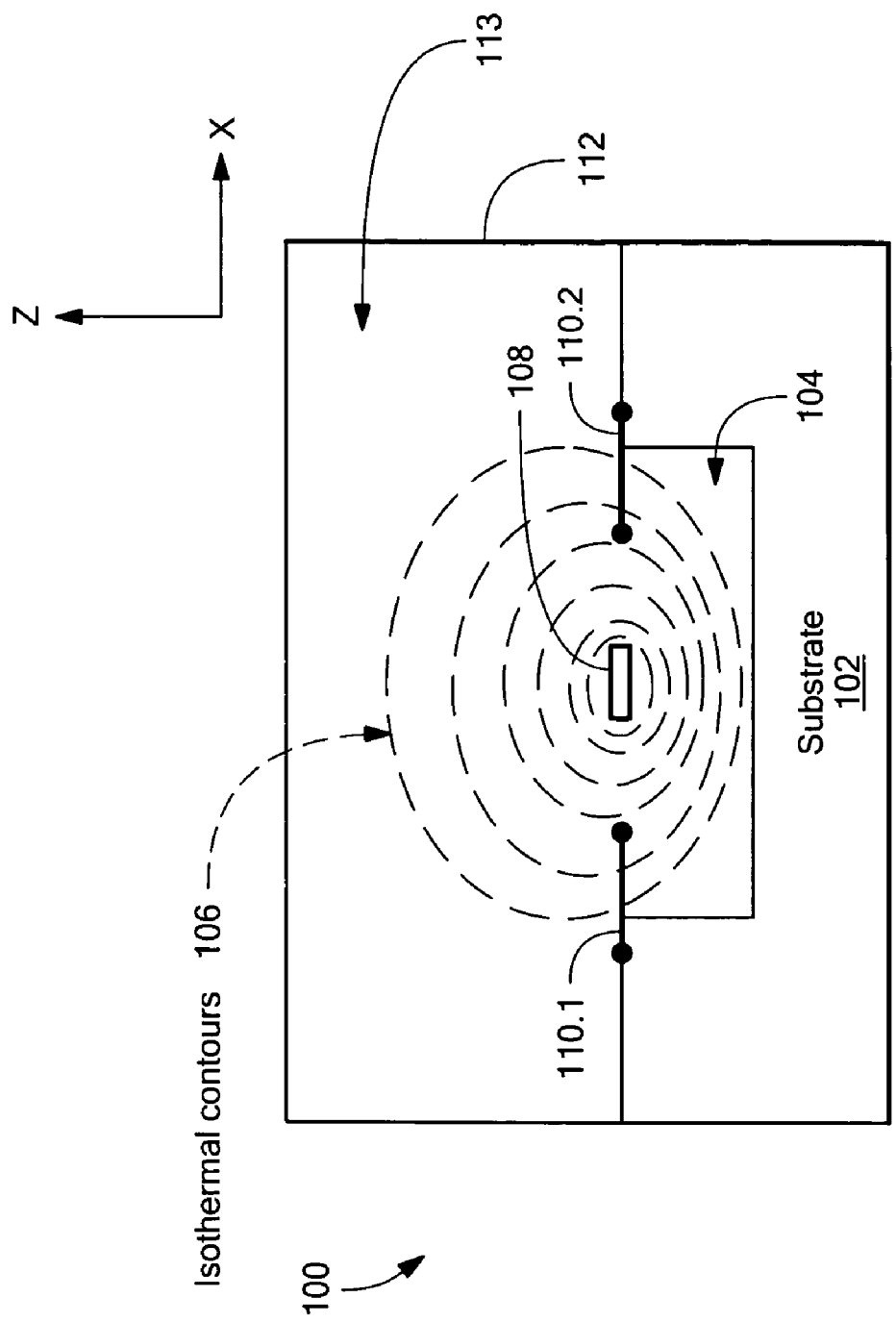
FIG. 1 is a cross-sectional view of a thermal acceleration sensor including a heater element and a pair of temperature sensing elements, showing isothermal contours generated by the heater element.

FIG. 1 depicts an illustrative embodiment of a thermal acceleration sensor 100, which is described herein to illustrate the mechanism of acceleration sensing employed within the presently disclosed 3-axis thermal accelerometer devices. In the illustrated embodiment, the thermal acceleration sensor 100 includes a substantially planar substrate 102, a cavity 104 formed in the substrate 102, and a heater element 108 and first and second temperature sensing elements 110.1-110.2 suspended over the cavity 104. Each of the first and second temperature sensing elements 110.1-110.2 includes a cold junction (not numbered) at one end thereof attached to a surface of the substrate 102, and a hot junction (not numbered) at the other end thereof disposed over the cavity 104. The thermal acceleration sensor 100 further includes a fluid surrounding the heater element 108 to allow convective heat transfer to take place within the device. It is noted that the entire structure of the thermal acceleration sensor 100 is enclosed in a hermetically sealed package 112, and therefore the fluid is disposed within the sealed package to fill the cavity 104 and a region 113 within the package 112 outside of the cavity 104. The heater element 108 is operative to produce a temperature gradient within the fluid, as represented by a plurality of isothermal contours 106.

As shown in FIG. 1, the isothermal contours 106 indicate that the temperature gradient produced by the heater element 108 is substantially symmetrical in the X or "horizontal" direction. It is understood that the temperature gradient is also substantially symmetrical in the horizontal direction of the Y-axis, which is conceptually perpendicular to the drawing sheet of FIG. 1. In contrast, the temperature gradient is asymmetrical in the Z or "vertical" direction, e.g., the isothermal contours 106 are closer together below the heater element 108 within the cavity 104 but spaced successively farther apart above the heater element 108 outside of the cavity 104. Accordingly, the temperature gradient at each hot junction of the temperature sensing elements 110.1-110.2 includes a vertical component having a magnitude that is dependent upon the thermal asymmetry in the Z direction and the position of the hot junction relative to the heater element 108.

Because the temperature sensing elements 110.1-110.2 are disposed at substantially equal distances from the heater element 108, the symmetrical temperature gradient along the X-axis causes the differential temperature between the temperature sensing elements 110.1-110.2 to be zero when the thermal acceleration sensor 100 is at rest. In the event an accelerating force is applied to the sensor 100 in the X direction, the temperature distribution shifts, thereby allowing a non-zero differential temperature proportional to the magnitude of the applied acceleration to be detected by the temperature sensing elements 110.1-110.2. It is understood that, in response to an applied acceleration in the Y direction, a non-zero differential temperature can also be detected by temperature sensing elements (not shown) placed along the Y-axis on opposite sides of and at substantially equal distances from the heater element 108. In the event an accelerating force is applied to the sensor 100 in the Z direction, the temperature distribution again shifts, however, the shifting temperature gradient affects both of the temperature sensing elements 110.1-110.2 in the same way. As a result, the common mode temperature detected by the temperature sensing elements 110.1-110.2 changes, and the magnitude of this temperature change is proportional to the magnitude of the applied acceleration in the Z direction. In general, under constant heater power, the common mode temperature of the hot junctions of the temperature sensing elements 110.1-110.2 is indicative of acceleration in the Z or vertical direction.

In one embodiment, the substrate 102 is made of silicon. Further, each temperature sensing element 110.1-110.2 can be implemented using a thermocouple, a resistor, or a diode, the heater element 108 can be implemented as a heater resistor, and the fluid allowing convective heat transfer to occur within the cavity 104 can be a quantity of air. Those of ordinary skill in this art will appreciate that the temperature sensing elements 110.1-110.2 and the heater element 108 can be fabricated using known CMOS or bipolar processes. Moreover, the cavity 104 can be formed by etching or by micro-machining the surface of the substrate 102 using any suitable technique.

Figure 2A:
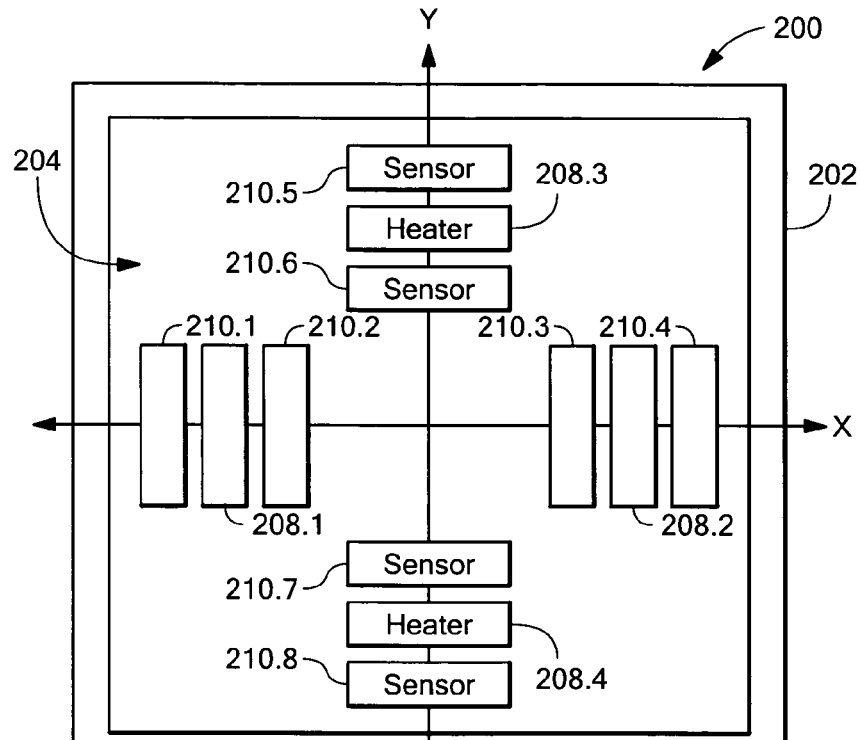
FIG. 2a is a plan view of a first embodiment of a single chip 3-axis thermal accelerometer device according to the present invention.
Figure 2B:
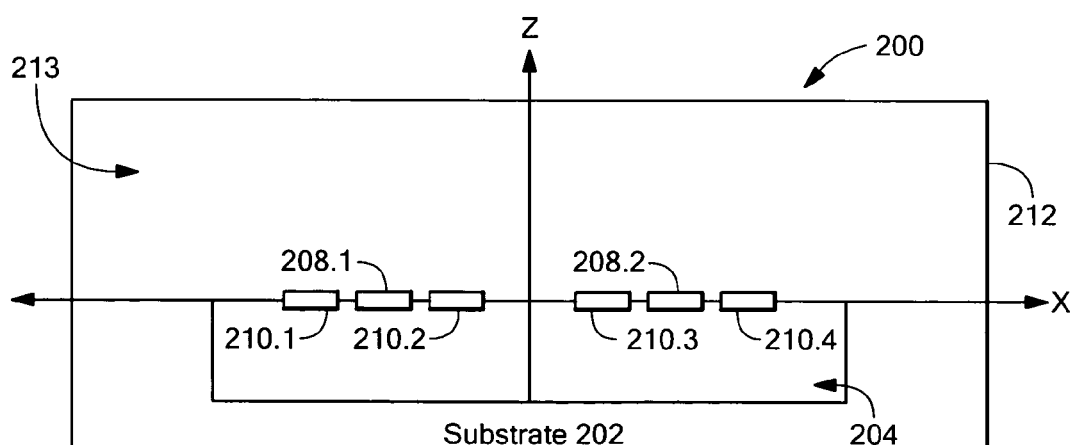

FIGS. 2a-2b depict an illustrative embodiment of a single chip 3-axis thermal accelerometer device 200, in accordance with the present invention. In the illustrated embodiment, the thermal accelerometer device 200 includes a substrate 202, at least one cavity 204 having a cross-section of any suitable shape (e.g., square or rectangular) etched in the substrate, a fluid (not numbered) such as air disposed in the cavity 204, a bridge structure 250 (see FIG. 2e) suspended over an opening (not numbered) of the cavity 204, and a plurality of heater elements 208.1-208.4 and a plurality of temperature sensing elements 210.1-210.8 disposed on the bridge structure 250. The substrate 202 has a substantially planar surface defined by the X and Y coordinate axes, and the bridge structure 250 is suspended over the opening of the cavity 204 substantially in the X-Y plane.

As shown in FIG. 2a, the pluralities of heater elements 208.1-208.4 and temperature sensing elements 210.1-210.8 are arranged in four groups, in which each group includes two temperature sensing elements and a single heater element. A first group including the heater element 208.1 and the temperature sensing elements 210.1-210.2, and a second group including the heater element 208.2 and the temperature sensing elements 210.3-210.4, are disposed along the X-axis on opposite sides of and at substantially equal distances from the center of the cavity opening, generally corresponding to the intersection of the X and Y-axes (see FIG. 2a). A third group including the heater element 208.3 and the temperature sensing elements 210.5-210.6, and a fourth group including the heater element 208.4 and the temperature sensing elements 210.7-210.8, are disposed along the Y-axis on opposite sides of and at substantially equal distances from the center of the cavity opening (see FIG. 2a). Within each group of heater and temperature sensing elements, the two temperature sensing elements are disposed along the X-axis or the Y-axis on opposite sides of and at substantially equal distances from the respective heater element.

It is noted that the entire structure of the thermal accelerometer device 200 is enclosed in a hermetically sealed package 212 (see FIG. 2b), and therefore the fluid is disposed within the sealed package to fill the cavity 204 and a region 213 within the package 212 outside of the cavity 204. In the illustrated embodiment, the region 213 is larger than the volume of the cavity 204. In a typical mode of operation, when no acceleration (including gravity) is applied to the thermal accelerometer device 200, the mechanism of heat transfer within the package 212 is by conduction only. However, when acceleration is applied to the thermal accelerometer device 200, the mechanism of heat transfer within the package 212 is by conduction and convection. Because the region 213 is larger than the volume of the cavity 204, the space within the package 212 in which convection takes place is asymmetrical along the Z-axis.

Figure 2C:
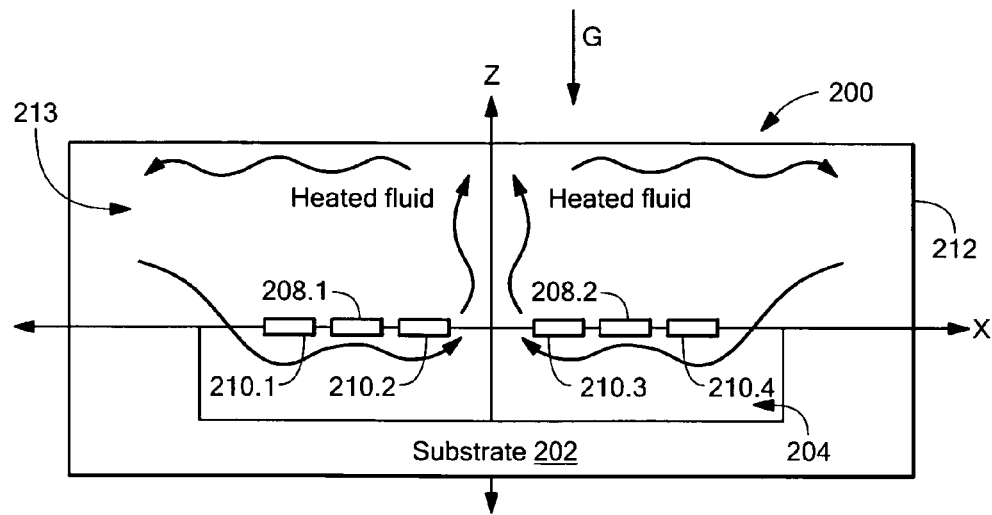
FIGS. 2c-2d are cross-sectional views of the single chip 3-axis thermal accelerometer device of FIG. 2a, showing the flow of heated fluid through the device in upright and inverted orientations, respectively.
Figure 2D:
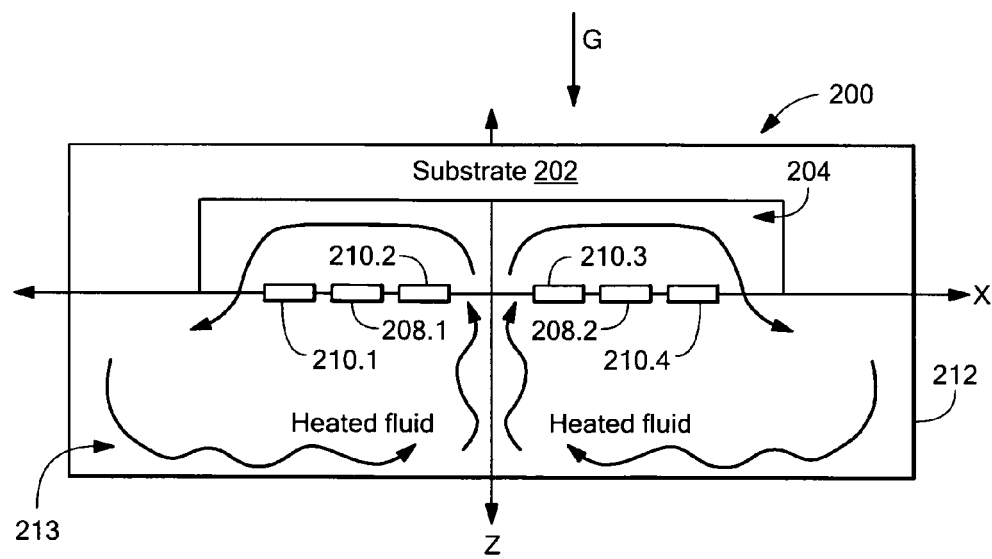

FIGS. 2c-2d illustrate the circulation of the fluid within the thermal accelerometer device 200 by convection in the presence of a gravitational acceleration G. Specifically, FIGS. 2c-2d depict the circulation of heated fluid currents through the cavity 204 and the region 213 when the device package 212 is in upright and inverted orientations, respectively. As shown in FIG. 2c, when the thermal accelerometer device 200 is in an upright orientation, the fluid heated by the heater elements 208.1-208.4 (see also FIG. 2a) flows from the center of the cavity opening, along the outer boundaries of the region 213, and back within the cavity 204 toward the center of the cavity opening. Because the fluid is cooled as it flows along the boundaries of the region 213 and is heated as it flows within the cavity 204, the temperatures $T_1$, $T_4$, $T_5$, $T_8$ detected by the respective outer temperature sensing elements 210.1, 210.4, 210.5, 210.8 decrease, while the temperatures $T_2$, $T_3$, $T_6$, $T_7$ detected by the respective inner temperature sensing elements 210.2, 210.3, 210.6, 210.7 increase.

As shown in FIG. 2d, when the thermal accelerometer device 200 is in an inverted orientation, the fluid heated by the heater elements 208.1-208.4 (see also FIG. 2a) flows within the cavity 204 from the center of the cavity opening toward the region 213, along the outer boundaries of the region 213, and back toward the center of the cavity opening. Because the fluid is heated as it flows within the cavity 204 and is cooled as it flows along the boundaries of the region 213, the temperatures $T_1$, $T_4$, $T_5$, $T_8$ detected by the respective outer temperature sensing elements 210.1, 210.4, 210.5, 210.8 increase, while the temperatures $T_2$, $T_3$, $T_6$, $T_7$ detected by the respective inner temperature sensing elements 210.2, 210.3, 210.6, 210.7 decrease.

The magnitudes of acceleration in the directions of the X, Y, and Z-axes can be determined using the differential temperatures detected by the temperature sensing elements 210.1-210.8 within the thermal accelerometer device 200 (see FIGS. 2a-2b). To obtain an indication of the magnitude of acceleration along the X-axis, the differential temperature $T_2$-$T_1$ detected by the temperature sensing elements 210.2, 210.1, respectively, of the first group, and the differential temperature $T_4$-$T_3$ detected by the temperature sensing elements 210.4, 210.3, respectively, of the second group, are determined in the same direction along the X-axis. Next, signals $S(T_2$-$T_1)$, $S(T_4$-$T_3)$ (e.g., voltage signals) representing the differential temperatures $T_2$-$T_1$ and $T_4$-$T_3$, respectively, are generated, and the magnitudes of the signals $S(T_2$-$T_1)$, $S(T_4$-$T_3)$ are determined and summed. The magnitude of acceleration along the X-axis can therefore be expressed as $$\text{X-axis acceleration} = \text{mag}[S(T_2\text{-}T_1)] + \text{mag}[S(T_4\text{-}T_3)], \quad (1)$$

in which "mag[S(ΔT)]" is the magnitude of the signal S representing the differential temperature ΔT.

Similarly, to obtain an indication of the magnitude of acceleration along the Y-axis, the differential temperature $T_5$-$T_6$ detected by the temperature sensing elements 210.5-210.6, respectively, of the third group, and the differential temperature $T_7$-$T_8$ detected by the temperature sensing elements 210.7-210.8, respectively, of the fourth group, are determined in the same direction along the Y-axis. Next, signals $S(T_5$-$T_6)$, $S(T_7$-$T_8)$ (e.g., voltage signals) representing the differential temperatures $T_5$-$T_6$ and $T_7$-$T_8$, respectively, are generated, and the magnitudes of the signals $S(T_5$-$T_6)$, $S(T_7$-$T_8)$ are determined and summed. The magnitude of acceleration along the Y-axis can therefore be expressed as $$\text{Y-axis acceleration} = \text{mag}[S(T_5\text{-}T_6)] + \text{mag}[S(T_7\text{-}T_8)], \quad (2)$$

in which "mag[S(ΔT)]" is the magnitude of the signal S representing the differential temperature ΔT.

To obtain an indication of the magnitude of acceleration along the Z-axis, i.e., perpendicular to the X-Y plane, the differential temperature $T_2$-$T_1$ detected by the temperature sensing elements 210.2, 210.1, respectively, of the first group, and the differential temperature $T_3$-$T_4$ detected by the temperature sensing elements 210.3-210.4, respectively, of the second group, are determined in opposing directions along the X-axis. Similarly, the differential temperature $T_6$-$T_5$ detected by the temperature sensing elements 210.6, 210.5, respectively, of the third group, and the differential temperature $T_7$-$T_8$ detected by the temperature sensing elements 210.7-210.8, respectively, of the fourth group, are determined in opposing directions along the Y-axis. Next, signals S($T_2$-$T_1$), S($T_3$-$T_4$) (e.g., voltage signals) representing the differential temperatures $T_2$-$T_1$ and $T_3$-$T_4$, respectively, and signals S(T6-$T_5$), S($T_7$-$T_8$) (e.g., voltage signals) representing the differential temperatures $T_6$-$T_5$ and $T_7$-$T_8$, respectively, are generated, and the magnitudes of the signals S($T_2$-$T_1$), S($T_3$-$T_4$), S($T_6$-$T_5$), S($T_7$-$T_8$) are determined and summed. The magnitude of acceleration along the Z-axis can therefore be expressed as $$\text{Z-axis acceleration}=\text{mag}[S(T_2-T_1)]+\text{mag}[S(T_3-T_4)]+\text{mag}[S(T_6-T_5)]+\text{mag}[S(T_7-T_8)], \quad (3)$$

in which "mag[S(ΔT)]" is the magnitude of the signal S representing the differential temperature ΔT. It is noted that to increase the sensitivity of acceleration sensing in the Z direction, an additional heater element may be disposed on the bridge structure 250 at substantially the center of the cavity opening, and the magnitude of acceleration along the Z-axis can be determined in the same manner as described above. This additional heater element may, however, cause the DC offset of the sensed acceleration in the Z direction to increase.

Figure 2E:
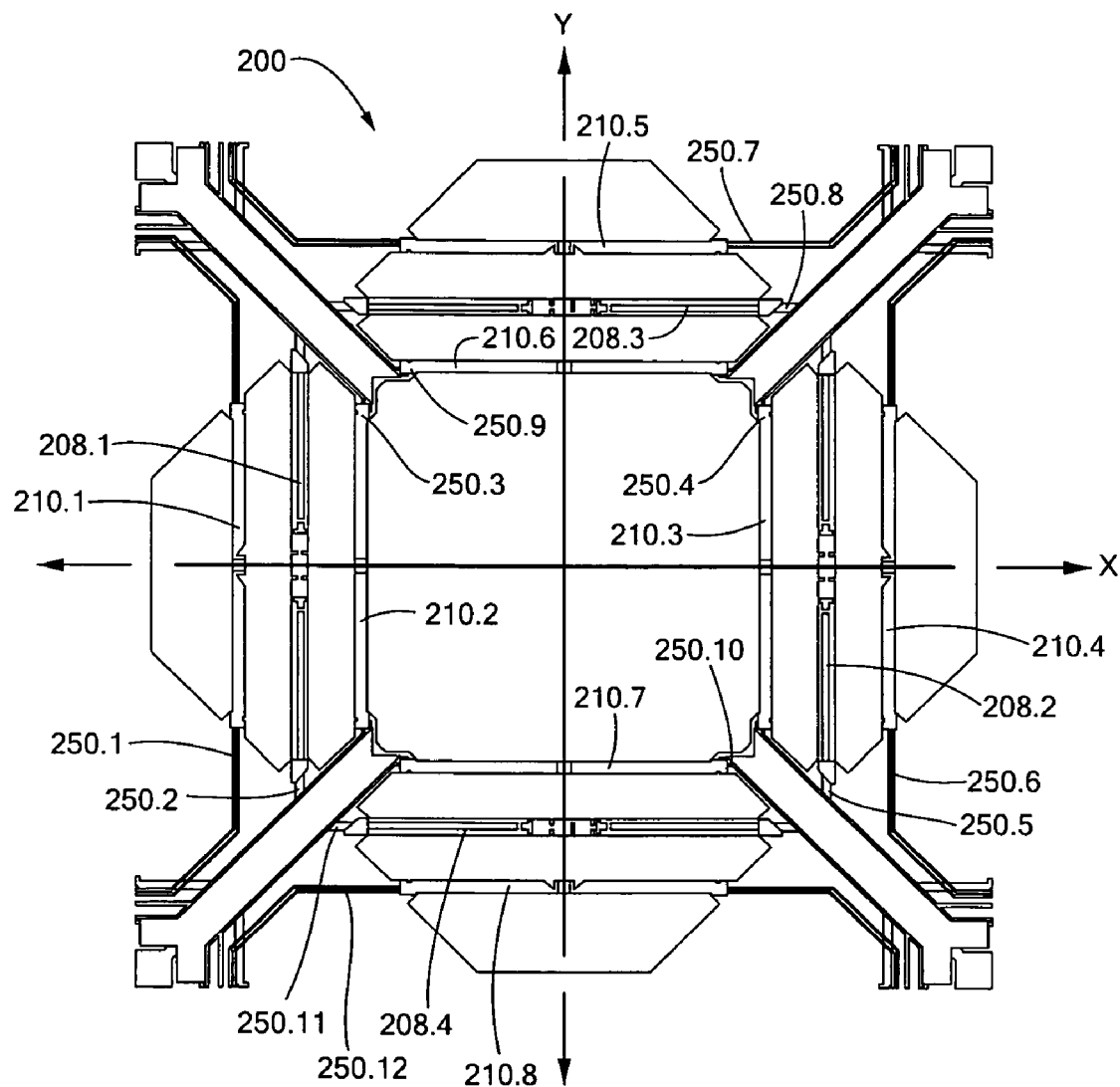
FIG. 2e is a detailed plan view of the single chip 3-axis thermal accelerometer device of FIG. 2a, showing an illustrative bridge structure.

FIG. 2e depicts a detailed view of the thermal accelerometer device 200, showing the bridge structure 250 upon which the pluralities of heater elements 208.1-208.4 and temperature sensing elements 210.1-210.8 are disposed. The bridge structure 250 includes a plurality of beams 250.1-250.12, which may be formed in the substrate 202 using any suitable etching or micro-machining technique. As shown in FIG. 2e, the heater elements 208.1-208.4 are disposed on the beams 250.2, 250.5, 250.8, 250.11, respectively. In addition, the temperature sensing elements 210.1-210.8 are disposed on the beams 250.1, 250.3, 250.4, 250.6, 250.7, 250.9, 250.10, 250.12, respectively. It should be noted that the bridge structure 250 is described herein for purposes of illustration, and that any other suitable bridge structure configuration may be employed.

Figure 3A:
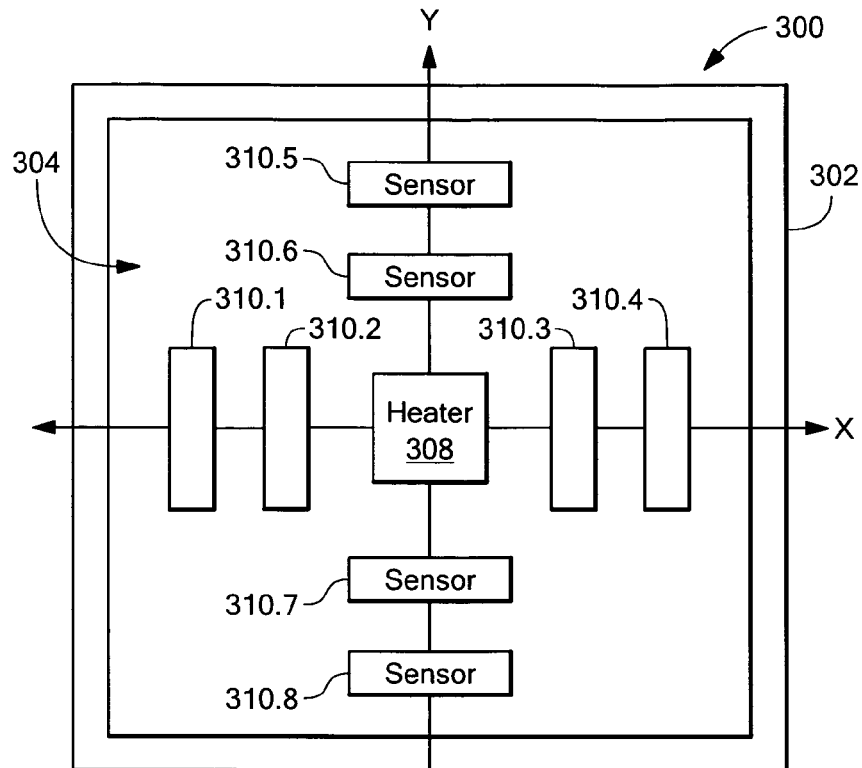
FIG. 3a is a plan view of a second embodiment of a single chip 3-axis thermal accelerometer device according to the present invention.
Figure 3B:
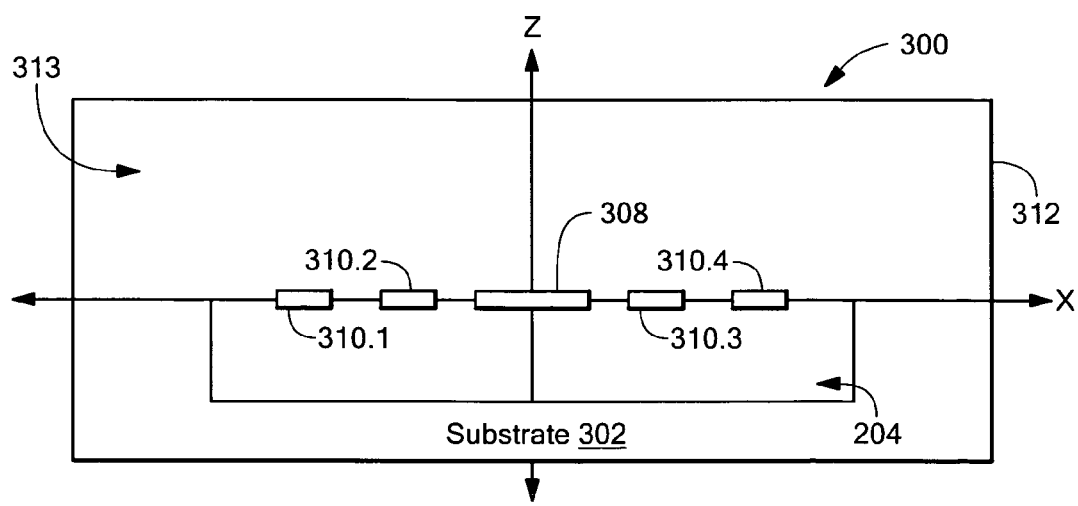

FIGS. 3a-3b depict another illustrative embodiment of a single chip 3-axis thermal accelerometer device 300, in accordance with the present invention. In the illustrated embodiment, the thermal accelerometer device 300 includes a substrate 302, at least one cavity 304 having a cross-section of any suitable shape (e.g., square or rectangular) etched in the substrate, a fluid (not numbered) such as air disposed in the cavity 304, a bridge structure 350 (see FIG. 3c) suspended over an opening (not numbered) of the cavity 304, and a heater element 308 and a plurality of temperature sensing elements 310.1-310.8 disposed on the bridge structure 350. A hermetically sealed package 312 forms an outer boundary of a region 313 above the cavity 304 (see FIG. 3b), and the fluid fills the cavity 304 and the space within the device corresponding to the region 313. Like the substrate 202 (see FIGS. 2a-2b), the substrate 302 has a substantially planar surface defined by the X and Y coordinate axes, and the bridge structure 350 is suspended over the opening of the cavity 304 substantially in the X-Y plane. In this second embodiment, however, the single heater element 308 is suspended by the bridge structure 350 at substantially the center of the cavity opening.

As shown in FIG. 3a, the temperature sensing elements 310.1-310.8 are arranged within the thermal accelerometer device 300 such that the pairs of temperature sensing elements 310.1 and 310.4, and 310.2 and 310.3, are disposed along the X-axis, and the pairs of temperature sensing elements 310.5 and 310.8, and 310.6 and 310.7, are disposed along the Y-axis. The elements within each pair of temperature sensing elements 310.1 and 310.4, 310.2 and 310.3, 310.5 and 310.8, and 310.6 and 310.7, are disposed on opposite sides of and at substantially equal distances from the heater element 308. In the illustrated embodiment, the temperature sensing elements 310.2, 310.3, 310.6, 310.7 are situated on the bridge structure 350 closer to the heater element 308 than the temperature sensing elements 310.1, 310.4, 310.5, 310.8. The temperature sensing elements 310.1, 310.4 can be used to obtain an indication of the magnitude of acceleration along the X-axis, and the temperature sensing elements 310.5, 310.8 can be used to obtain an indication of the magnitude of acceleration along the Y-axis. In addition, the temperature sensing elements 310.2, 310.3, 310.6, 310.7 can be used to obtain an indication of the magnitude of acceleration along the Z-axis.

To obtain an indication of the magnitude of acceleration along the X-axis, the differential temperature $T_4$-$T_1$ detected by the temperature sensing elements 310.4, 310.1, respectively, is determined. Next, a signal S($T_4$-$T_1$) (e.g., a voltage signal) representing the differential temperature $T_4$-$T_1$ is generated, and the magnitude of the signal S($T_4$-$T_1$) is determined. The magnitude of acceleration along the X-axis can therefore be expressed as $$\text{X-axis acceleration}=\text{mag}[S(T_4-T_1)], \quad (4)$$

in which "mag[S(ΔT)]" is the magnitude of the signal S representing the differential temperature ΔT.

Similarly, to obtain an indication of the magnitude of acceleration along the Y-axis, the differential temperature $T_5$-$T_8$ detected by the temperature sensing elements 310.5, 310.8, respectively, is determined. Next, a signal S($T_5$-$T_8$) (e.g., a voltage signal) representing the differential temperature $T_5$-$T_8$ is generated, and the magnitude of the signal S($T_5$-$T_8$) is determined. The magnitude of acceleration along the Y-axis can therefore be expressed as $$\text{Y-axis acceleration}=\text{mag}[S(T_5-T_8)], \quad (5)$$

in which "mag[S(ΔT)]" is the magnitude of the signal S representing the differential temperature ΔT.

To obtain an indication of the magnitude of acceleration along the Z-axis, i.e., perpendicular to the X-Y plane, the temperatures $T_2$, $T_3$, $T_6$, $T_7$ detected by the temperature sensing elements 310.2, 310.3, 310.6, 310.7, respectively, are determined. Next, signals S($T_2$), S($T_3$), S($T_6$), S($T_7$) (e.g., voltage signals) representing the temperatures $T_2$, $T_3$, $T_6$, $T_7$ are generated, and the magnitudes of the signals S($T_2$), S($T_3$), S($T_6$), S($T_7$) are determined. An indication of the common mode temperature detected by the temperature sensing elements 310.2, 310.3, 310.6, 310.7 is then obtained by taking the average of the magnitudes of the signals S($T_2$), S($T_3$), S($T_6$), S($T_7$). The magnitude of acceleration along the Z-axis can therefore be expressed as $$\text{Z-axis acceleration}=\{\text{mag}[S(T_2)]+\text{mag}[S(T_3)]+\text{mag}[S(T_6)]+\text{mag}[S(T_7)]\}/4, \quad (6)$$

in which "mag[S(T)]" is the magnitude of the signal S representing the temperature T.

It is noted that the outputs of the temperature sensing elements 310.2, 310.3, 310.6, 310.7 employed to perform acceleration sensing in the Z direction, the outputs of the temperature sensing elements 310.1, 310.4 employed to perform acceleration sensing in the X direction, and the outputs of the temperature sensing elements 310.5, 310.8 employed to perform acceleration sensing in the Y direction, each change in proportion to changes in the applied acceleration along the Z-axis, but in different ratios. In an alternative embodiment, the magnitude of acceleration along the Z-axis can therefore be expressed as $$Z\ acceleration = \{mag[S(T_2)] + mag[S(T_3)] + mag[S(T_6)] + mag[S(T_7)]\} / \{mag[S(T_1)] + mag[S(T_4)] + mag[S(T_5)] + mag[S(T_8)]\}, \quad (7)$$

in which "mag[S(T)]" is the magnitude of the signal S representing the temperature T. It is noted that the indication of Z-axis acceleration expressed in equation (7) exhibits a temperature coefficient that is less than that exhibited by the indication of Z-axis acceleration expressed in equation (6).

Figure 3C:
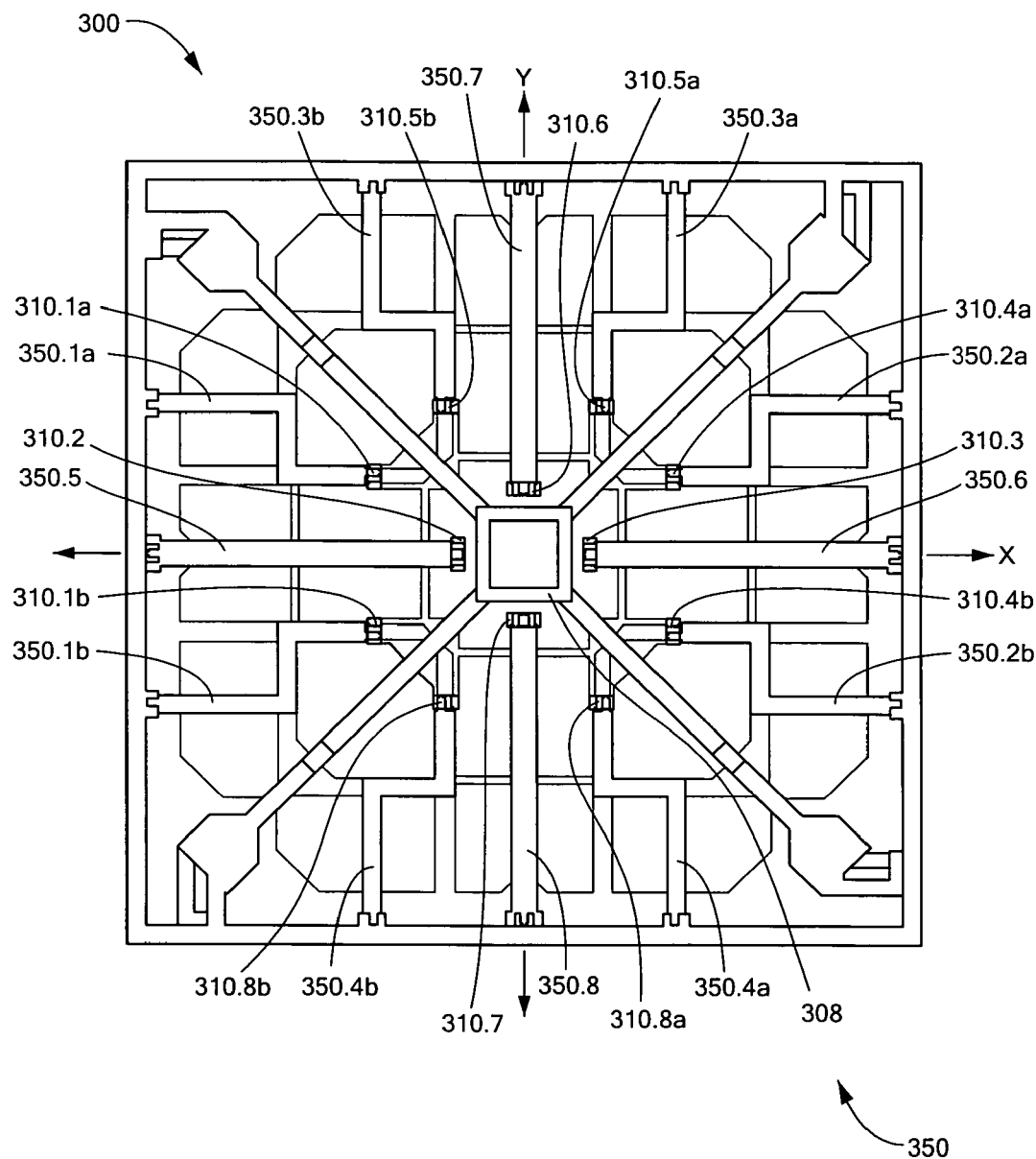
FIG. 3c is a detailed plan view of the single chip 3-axis thermal accelerometer device of FIG. 3a, showing an illustrative bridge structure.

FIG. 3c depicts a detailed view of the thermal accelerometer device 300, showing the bridge structure 350 upon which the heater element 308 and the temperature sensing elements 310.1-310.8 are disposed. The bridge structure 350 includes a plurality of beams 350.1a-350.1b, 350.2a-350.2b, 350.3a-350.3b, 350.4a-350.4b, 350.5, 350.6, 350.7, 350.8, which may be formed in the substrate 302 using any suitable etching or micro-machining technique. In the illustrated embodiment, the temperature sensing element 310.1 includes temperature sensing elements 310.1a-310.1b, the temperature sensing element 310.4 includes temperature sensing elements 310.4a-310.4b, the temperature sensing element 310.5 includes temperature sensing elements 310.5a-310.5b, and the temperature sensing element 310.8 includes temperature sensing elements 310.8a-310.8b. As shown in FIG. 3c, the temperature sensing elements 310.1a, 310.1b are disposed on the beams 350.1a-350.1b, respectively, the temperature sensing elements 310.4a, 310.4b are disposed on the beams 350.2a-350.2b, respectively, the temperature sensing elements 310.5a, 310.5b are disposed on the beams 350.3a-350.3b, respectively, and the temperature sensing elements 310.8a, 310.8b are disposed on the beams 350.4a-350.4b, respectively. In addition, the temperature sensing elements 310.2, 310.3, 310.6, 310.7 are disposed on the beams 350.5, 350.6, 350.7, 350.8, respectively. It should be noted that the bridge structure 350 is described herein for purposes of illustration, and that any other suitable bridge structure configuration may alternatively be employed.

Figure 4A:
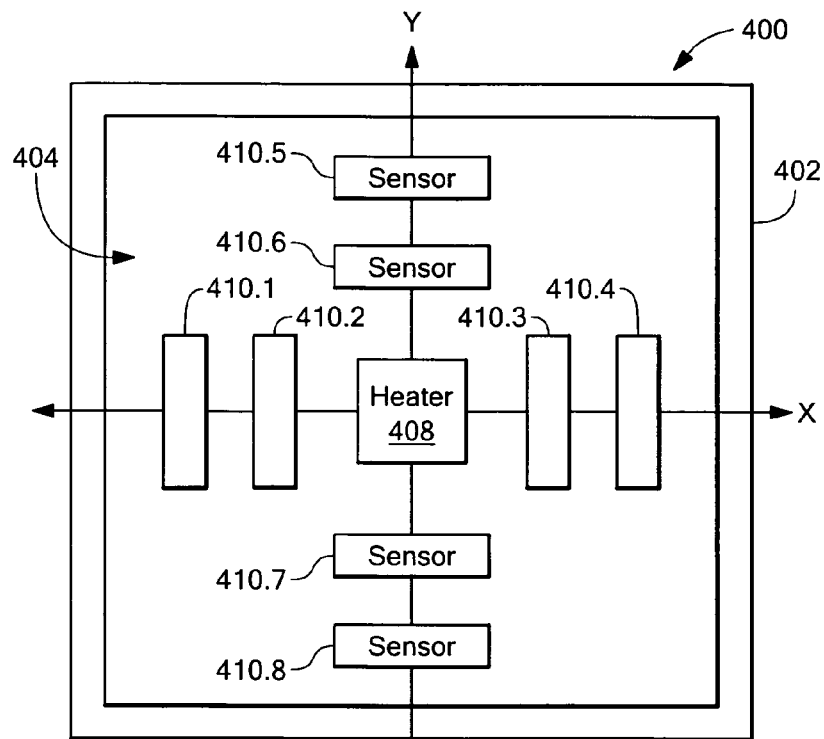
FIG. 4a is a plan view of a third embodiment of a single chip 3-axis thermal accelerometer device according to the present invention.
Figure 4B:
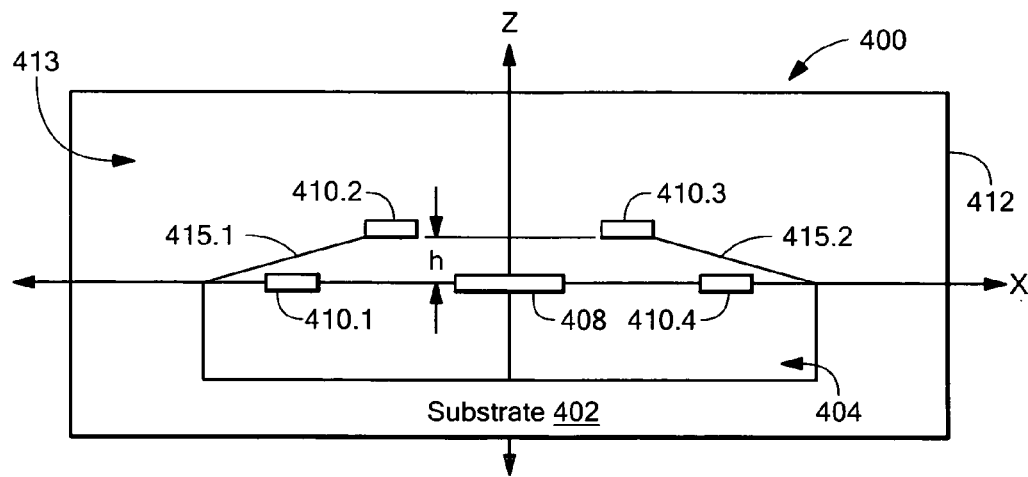

FIGS. 4a-4b depict a third illustrative embodiment of a single chip 3-axis thermal accelerometer device 400, in accordance with the present invention. In the illustrated embodiment, the thermal accelerometer device 400 includes a substrate 402, at least one cavity 404 having a cross-section of any suitable shape (e.g., square or rectangular) etched in the substrate, a fluid (not numbered) such as air disposed in the cavity 404, a bridge structure 450 (see, e.g., FIG. 4c) suspended over an opening (not numbered) of the cavity 404, and a heater element 408 and a plurality of temperature sensing elements 410.1-410.8 disposed on the bridge structure 450. A hermetically sealed package 412 forms an outer boundary of a region 413 above the cavity 404 (see FIG. 4b), and the fluid fills the cavity 404 and the region 413 within the device.

Like the corresponding elements included in the thermal accelerometer device 300 (see FIGS. 3a-3b), the substrate 402 has a substantially planar surface defined by the X and Y coordinate axes, the bridge structure 450 is suspended over the opening of the cavity 404, the single heater element 408 is suspended by the bridge structure 450 at substantially the center of the cavity opening, and the temperature sensing elements 410.2, 410.3, 410.6, 410.7 are situated on the bridge structure 450 closer to the heater element 408 than the temperature sensing elements 410.1, 410.4, 410.5, 410.8. In this third embodiment, however, the beams suspending the temperature sensing elements 410.2, 410.3, 410.6, 410.7 over the cavity 404 are configured to position the elements 410.2, 410.3, 410.6, 410.7 out of the X-Y plane. For example, FIG. 4b illustrates beams 415.1-415.2 upon which the temperature sensing elements 410.2, 410.3 are disposed, respectively. It should be understood that the thermal accelerometer device 400 includes additional beams like the beams 415.1-415.2 upon which the temperature sensing elements 410.6, 410.7 are disposed. As shown in FIG. 4b, the temperature sensing elements 410.2, 410.3 are suspended by the beams, respectively, a distance h above the X-Y plane. In one embodiment, the distance h is greater than or equal to 10% of the length of each of the beams, e.g., the length of each of the beams 415.1-415.2 from the substrate 402 to the respective temperature sensing element.

As shown in FIG. 4a, the temperature sensing elements 410.1-410.8 are arranged within the thermal accelerometer device 400 such that the pairs of temperature sensing elements 410.1 and 410.4, and 410.2 and 410.3 are disposed along the X-axis, and the pairs of temperature sensing elements 410.5 and 410.8, and 410.6 and 410.7, are disposed along the Y-axis. The elements within each pair of temperature sensing elements 410.1 and 410.4, 410.2 and 410.3, 410.5 and 410.8, and 410.6 and 410.7, are disposed on opposite sides of and at substantially equal distances from the heater element 408. The temperature sensing elements 410.1, 410.4 can be used to obtain an indication of the magnitude of acceleration along the X-axis, and the temperature sensing elements 410.5, 410.8 can be used to obtain an indication of the magnitude of acceleration along the Y-axis. In addition, the temperature sensing elements 410.2, 410.3, 410.6, 410.7 can be used to obtain an indication of the magnitude of acceleration along the Z-axis.

To obtain an indication of the magnitude of acceleration along the X-axis, the differential temperature $T_4-T_1$ detected by the temperature sensing elements 410.4, 410.1, respectively, is determined. Next, a signal $S(T_4-T_1)$ (e.g., a voltage signal) representing the differential temperature $T_4-T_1$ is generated, and the magnitude of the signal $S(T_4-T_1)$ is determined. The magnitude of acceleration along the X-axis can therefore be expressed as $$X\text{-axis acceleration} = mag[S(T_4-T_1)], \quad (8)$$

in which "mag[S(ΔT)]" is the magnitude of the signal S representing the differential temperature ΔT.

Similarly, to obtain an indication of the magnitude of acceleration along the Y-axis, the differential temperature $T_5-T_8$ detected by the temperature sensing elements 410.5, 410.8, respectively, is determined. Next, a signal $S(T_5-T_8)$ (e.g., a voltage signal) representing the differential temperature $T_5-T_8$ is generated, and the magnitude of the signal $S(T_5-T_8)$ is determined. The magnitude of acceleration along the Y-axis can therefore be expressed as $$Y\text{-axis acceleration} = mag[S(T_5-T_8)], \quad (9)$$

in which "mag[S(ΔT)]" is the magnitude of the signal S representing the differential temperature ΔT.

To obtain an indication of the magnitude of acceleration along the Z-axis, i.e., perpendicular to the X-Y plane, the temperatures $T_2$, $T_3$, $T_6$, $T_7$ detected by the temperature sensing elements 410.2, 410.3, 410.6, 410.7, respectively, are determined. Next, signals $S(T_2)$, $S(T_3)$, $S(T_6)$, $S(T_7)$ (e.g., voltage signals) representing the temperatures $T_2$, $T_3$, $T_6$, $T_7$ are generated, and the magnitudes of the signals $S(T_2)$, $S(T_3)$, $S(T_6)$, $S(T_7)$ are determined. An indication of the common mode temperature detected by the temperature sensing elements 410.2, 410.3, 410.6, 410.7 is then obtained by taking the average of the magnitudes of the signals $S(T_2)$, $S(T_3)$, $S(T_6)$, $S(T_7)$. The magnitude of acceleration along the Z-axis can therefore be expressed as $$\text{Z-axis acceleration} = \{\text{mag}[S(T_2)] + \text{mag}[S(T_3)] + \text{mag}[S(T_6)] + \text{mag}[S(T_7)]\}/4, \quad (10)$$

in which "mag[S(T)]" is the magnitude of the signal S representing the temperature T.

Figure 4C:
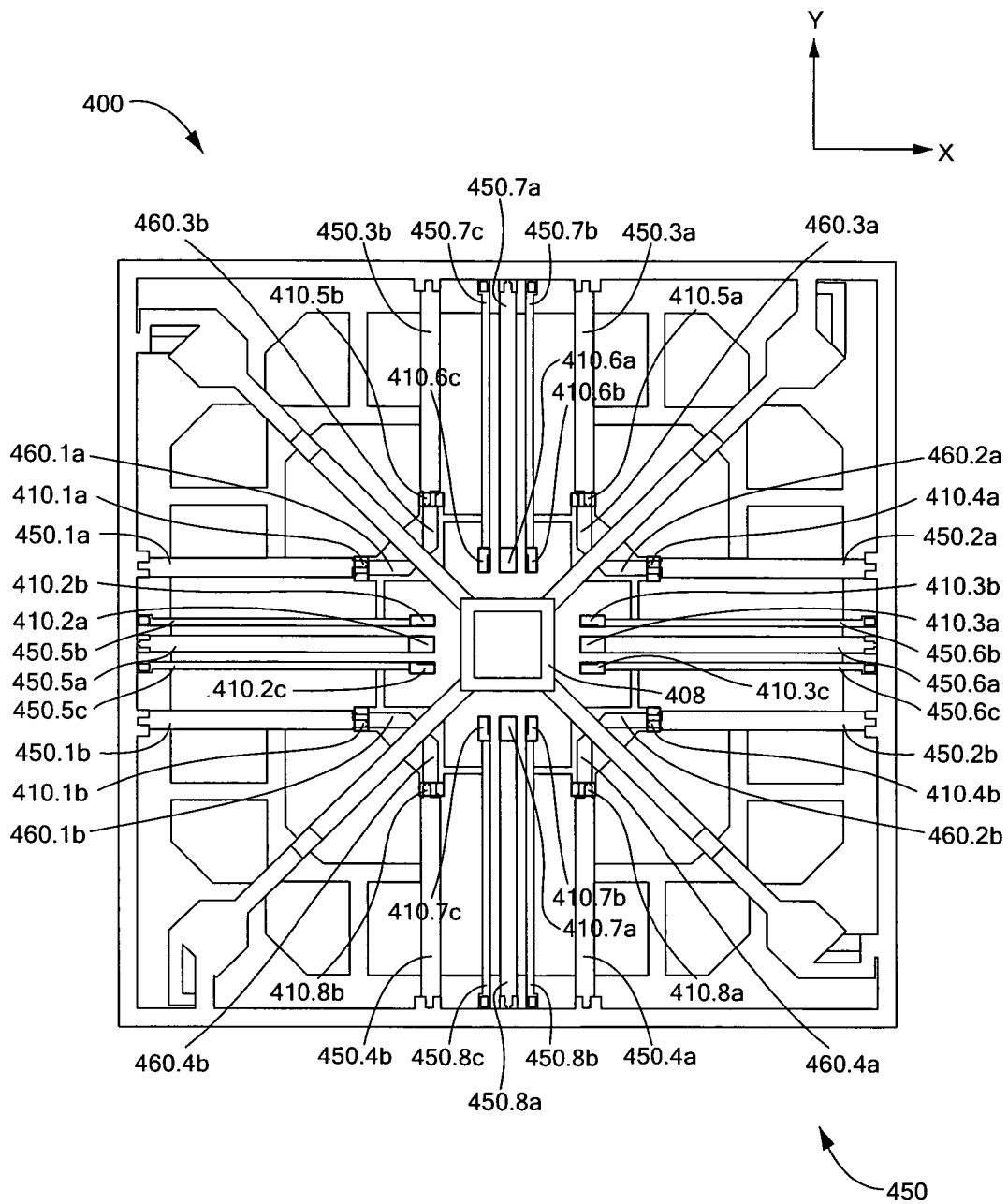
FIG. 4c is a detailed plan view of the single chip 3-axis thermal accelerometer device of FIG. 4a, showing an illustrative bridge structure.

FIG. 4c depicts a detailed view of the thermal accelerometer device 400, showing the bridge structure 450 upon which the heater element 408 and the temperature sensing elements 410.1-410.8 are disposed. The bridge structure 450 includes a plurality of beams 450.1a-450.1b, 450.2a-450.2b, 450.3a-450.3b, 450.4a-450.4b, 450.5-450.12, which may be formed in the substrate 402 using any suitable etching or micro-machining technique. In the illustrated embodiment, the temperature sensing element 410.1 includes temperature sensing elements 410.1a-410.1b, the temperature sensing element 410.4 includes temperature sensing elements 410.4a-410.4b, the temperature sensing element 410.5 includes temperature sensing elements 410.5a-410.5b, and the temperature sensing element 410.8 includes temperature sensing elements 410.8a-410.8b. As shown in FIG. 4c, the temperature sensing elements 410.1a, 410.1b are disposed on the beams 450.1a-450.1b, respectively, the temperature sensing elements 410.4a, 410.4b are disposed on the beams 450.2a-450.2b, respectively, the temperature sensing elements 410.5a, 410.5b are disposed on the beams 450.3a-450.3b, respectively, and the temperature sensing elements 410.8a, 410.8b are disposed on the beams 450.4a-450.4b, respectively.

In addition, the temperature sensing element 410.2 includes a temperature sensing element 410.2a (Z+) and two temperature sensing elements 410.2b-410.2c (Z−) disposed on opposite sides of the element 410.2a, the temperature sensing element 410.3 includes a temperature sensing element 410.3a (Z+) and two temperature sensing elements 410.3b-410.3c (Z−) disposed on opposite sides of the element 410.3a, the temperature sensing element 410.6 includes a temperature sensing element 410.6a (Z+) and two temperature sensing elements 410.6b-410.6c (Z−) disposed on opposite sides of the element 410.6a, and the temperature sensing element 410.7 includes a temperature sensing element 410.7a (Z+) and two temperature sensing elements 410.7b-410.7c (Z−) disposed on opposite sides of the element 410.7a.

As shown in FIG. 4c, the temperature sensing elements 410.1a, 410.1b are disposed on the beams 450.1a-450.1b, respectively, the temperature sensing elements 410.4a, 410.4b are disposed on the beams 450.2a-450.2b, respectively, the temperature sensing elements 410.5a, 410.5b are disposed on the beams 450.3a-450.3b, respectively, and the temperature sensing elements 410.8a, 410.8b are disposed on the beams 450.4a-450.4b, respectively. 410.2c (Z−) are disposed on the beams 450.5a-450.5c, respectively, the temperature sensing elements 410.3a (Z+) and 410.3b-410.3c (Z−) are disposed on the beams 450.6a-450.6c, respectively, the temperature sensing elements 410.6a (Z+) and 410.6b-410.6c (Z−) are disposed on the beams 450.7a-450.7c, respectively, and the temperature sensing elements 410.7a (Z+) and 410.7b-410.7c (Z−) are disposed on the beams 450.8a-450.8c, respectively. It should be noted that the bridge structure 450 is described herein for purposes of illustration, and that any other suitable bridge structure configuration may alternatively be employed.

The bridge structure 450 includes bridges 460.1a, 460.1b configured to connect the temperature sensing elements 410.1a, 410.1b, respectively, to the heater element 408, bridges 460.2a, 460.2b configured to connect the temperature sensing elements 410.4a, 410.4b, respectively, to the heater element 408, bridges 460.3a, 460.3b configured to connect the temperature sensing elements 410.5a, 410.5b, respectively, to the heater element 408, and bridges 460.4a, 460.4b configured to connect the temperature sensing elements 410.8a, 410.8b, respectively, to the heater element 408. In one embodiment, the bridges 460.1a-460.4b have reduced thermal conductivity within the overall bridge structure 450.

Accordingly, the mechanism of heat transfer from the heater element 408 to the temperature sensing elements 410.1a, 410.1b, 410.4a, 410.4b, 410.5a, 410.5b, 410.8a, 410.8b is by conduction via the respective solid bridge structures 460.1a-460.4b. In contrast, the mechanism of heat transfer from the heater element 408 to the temperature sensing elements 410.2a (Z+), 410.2b-410.2c (Z−), 410.3a (Z+), 410.3b-410.3c (Z−), 410.6a (Z+), 410.6b-410.6c (Z−), 410.7a (Z+), 410.7b-410.7c (Z−) is by convection only. In addition, the mechanism of heat transfer from the heater element 408 to the temperature sensing elements 410.2b-410.2c (Z−), 410.3b-410.3c (Z−), 410.6b-410.6c (Z−), 410.7b-410.7c (Z−) is by both conduction (via the respective solid bridge structures) and convection. Because the heat conductivity through the solid bridge structures 460.1a-460.4b is greater than the heat conductivity through the fluid disposed within the thermal accelerometer device 400, the temperature sensing elements 410.2a, 410.3a, 410.6a, and 410.7a must be closer to the heater element 408 than the temperature sensing elements 410.2b-410.2c, 410.3b-410.3c, 410.6b-410.6c, and 410.7b-410.7c for the respective temperature sensing elements to achieve the same temperature. In the illustrated embodiment, the temperature sensing elements 410.2a-410.2c, 410.3a-410.3c, 410.6a-410.6c, 410.7a-410.7c, 410.1a-410.1b, 410.4a-410.4b, 410.5a-410.5b, 410.8a-410.8b are positioned within the thermal accelerometer device 400 so that the Z-axis 0-g offset (i.e., the Z-axis DC offset in the absence of an applied acceleration) is substantially equal to zero.

To obtain an indication of the magnitude of acceleration along the Z-axis, i.e., perpendicular to the X-Y plane, the temperatures $T_{2a}$, $T_{3a}$, $T_{6a}$, $T_{7a}$, $T_{2bc}$, $T_{3bc}$, $T_{6bc}$, and $T_{7bc}$ detect the temperature sensing elements 410.2a, 410.3a, 410.6a, 410.7a, 410.2b-410.2c, 410.3b-410.3c, 410.6b-410.6c, and 410.7b-410.7c, respectively, are determined. It is noted that the temperature $T_{2bc}$ corresponds to the temperature detected by the temperature sensing elements 410.2b and 410.2c. Similarly, the temperatures $T_{3bc}$, $T_{6bc}$, and $T_{7bc}$ correspond to the temperatures detected by the temperature sensing elements 410.3b and 410.3c, 410.6b and 410.6c, and 410.7b and 410.7c, respectively. Next, signals $S(T_{2a})$, $S(T_{3a})$, $S(T_{6a})$, $S(T_{7a})$, $S(T_{2bc})$, $S(T_{3bc})$, $S(T_{6bc})$, and $S(T_{7bc})$ (e.g., voltage signals) representing the temperatures $T_{2a}$, $T_{3a}$, $T_{6a}$, $T_{7a}$, $T_{2bc}$, $T_{3bc}$, $T_{6bc}$, and $T_{7bc}$, respectively, are generated, and the magnitudes of the signals $S(T_{2a})$, $S(T_{3a})$, $S(T_{6a})$, $S(T_{7a})$, $S(T_{2bc})$, $S(T_{3bc})$, $S(T_{6bc})$ and $S(T_{7bc})$ are determined. An indication of the differential mode temperature detected by the temperature sensing elements 410.2, 410.3, 410.6, 410.7 is then obtained by taking the sum of the magnitudes of the signals {S(T$_{2a}$)-S(T$_{2bc}$)}, {S(T$_{3a}$)-S(T$_{3bc}$)}, {S(T$_{6a}$)-S(T$_{6bc}$)}, and {S(T$_{7a}$)-S(T$_{7bc}$)}. The magnitude of acceleration along the Z-axis can therefore be expressed as $$Z\text{-axis acceleration}=\text{mag}\{S(T_{2a})-S(T_{2bc})\}+\text{mag}\{S(T_{3a})-S(T_{3bc})\}\text{mag}\{S(T_{6a})-S(T_{6bc})\}+\text{mag}\{S(T_{7a})-S(T_{7bc})\}, \quad (11)$$

in which "mag[S(T)]" is the magnitude of the signal S representing the temperature T.

As described above, the beams (e.g., the beams 415.1-415.2; see FIG. 4b) suspending the temperature sensing elements 410.2, 410.3, 410.6, 410.7 over the cavity 404 are configured to position the elements 410.2, 410.3, 410.6, 410.7 out of the X-Y plane. In the presently disclosed embodiment, the beams 415.1-415.2 are so configured by forming each beam 415.1, 415.2 with multiple layers of material, in which each material layer has different stress characteristics, thereby causing the beams 415.1-415.2 to bend out of the X-Y plane when the beams are released from the substrate during fabrication, as illustrated in FIG. 4b. In one embodiment, one or more lower layers of the beams have compressive stress characteristics, and may be implemented as thermal growth Silicon Oxide, CVD Silicon Oxide, and/or Silicon Nitride layers or any other suitable layers. Further, one or more upper layers of the beams have tensile stress characteristics, and may be implemented as metal and/or poly-silicon/poly-silicide layers or any other suitable layers.

Figure 4D:
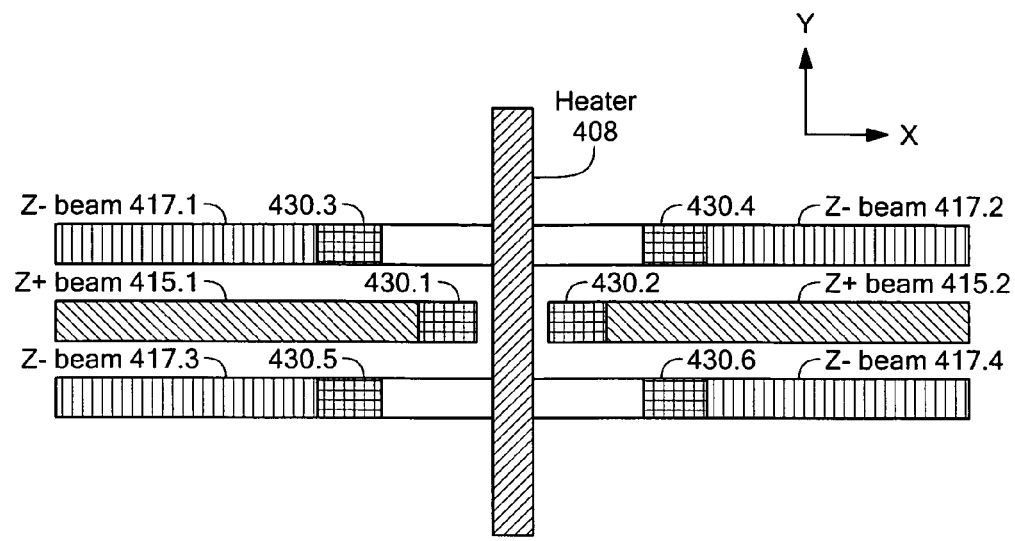
FIG. 4d is a plan view of a first illustrative embodiment of a bridge structure included in the single chip 3-axis thermal accelerometer device of FIG. 4a, the bridge structure being configured to position temperature sensing elements within the device out of the plane of the device substrate.
Figure 4E:
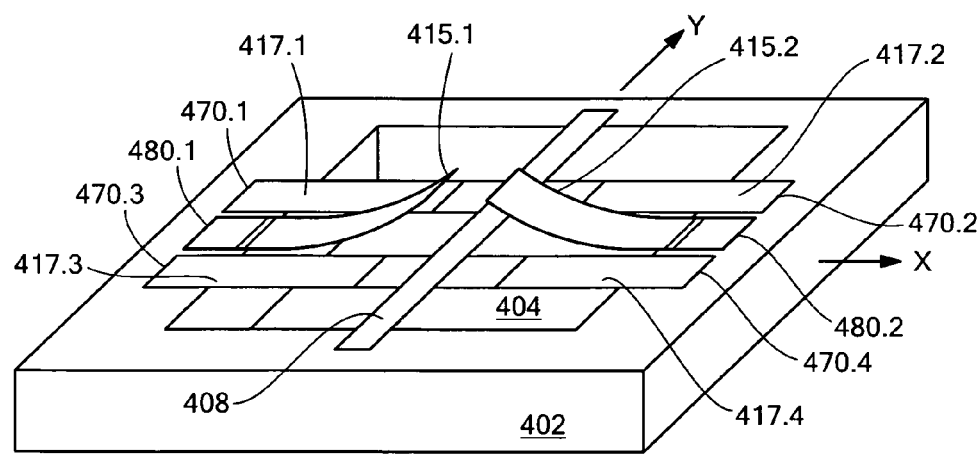
FIG. 4e is a perspective view of the bridge structure of FIG. 4d.

FIGS. 4d-4e depict a first illustrative configuration of the beams 415.1-415.2 (see also FIG. 4b). In this illustrative configuration, the temperature sensing elements that provide for acceleration sensing along the Z-axis include a temperature sensing element 430.1 (Z+) disposed on the beam 415.1, a temperature sensing element 430.2 (Z+) disposed on the beam 415.2, a temperature sensing element 430.3 (Z−) disposed on a beam 417.1, a temperature sensing element 430.4 (Z−) disposed on a beam 417.2, a temperature sensing element 430.5 (Z−) disposed on a beam 417.3, and a temperature sensing element 430.6 (Z−) disposed on a beam 417.4. As shown in FIG. 4d, the heater element 408 is disposed between the group of beams 415.1, 417.1, 417.3 and the group of beams 415.2, 417.2, 417.4 in the X-Y plane at substantially the center of the opening of the cavity 404.

FIG. 4e depicts a perspective view of the beams 415.1, 415.2, 417.1, 417.2, 417.3, and 417.4, showing the Z+ beams 415.1-415.2 bent out of the X-Y plane. Because each Z+ beam 415.1, 415.2 is formed with multiple layers of material, each layer having different stress characteristics, the Z+ beams 415.1-415.2 bend out of the X-Y plane when they are released from the substrate 402 (see also FIG. 4b). As a result, the temperature sensing elements disposed at the ends of the Z+ beams 415.1-415.2 are positioned out of the X-Y plane. It is noted that the ends 480.1-480.2 of the Z+beams 415.1-415.2, respectively, and the ends 470.1, 470.2, 470.3, 470.4 of the Z− beams 417.1, 417.2, 417.3, 417.4, respectively, are fixedly attached to the surface of the substrate 402 in the X-Y plane.

To obtain an indication of the magnitude of acceleration along the Z-axis using the beam configuration of FIGS. 4d-4e, the temperatures T$_{1,Z+}$, T$_{2,Z+}$, T$_{1,Z-}$, T$_{2,Z-}$, T$_{3,Z-}$, T$_{4,Z-}$ detected by the temperature sensing elements 415.1, 415.2, 417.1, 417.2, 417.3, 417.4, respectively, are determined. Next, signals S(T$_{1,Z+}$), S(T$_{2,Z+}$), S(T$_{1,Z-}$), S(T$_{2,Z-}$), S(T$_{3,Z-}$), S(T$_{4,Z-}$) (e.g., voltage signals) representing the temperatures T$_{1,Z+}$, T$_{2,Z+}$, T$_{1,Z-}$, T$_{2,Z-}$, T$_{3,Z-}$, T$_{4,Z-}$ are generated, and the magnitudes of the signals S(T$_{1,Z+}$), S(T$_{2,Z+}$), S(T$_{1,Z-}$), S(T$_{2,Z-}$), S(T$_{3,Z-}$), S(T$_{4,Z-}$) are determined. The magnitude of acceleration along the Z-axis can therefore be expressed as $$Z\text{-axis acceleration}=\{\text{mag}[S(T_{1,Z+})]+\text{mag}[S(T_{2,Z+})]\}-\{\text{mag}[S(T_{1,Z-})]+\text{mag}[S(T_{2,Z-})]+\text{mag}[S(T_{3,Z-})]+\text{mag}[S(T_{4,Z-})]\}, \quad (12)$$

in which "mag[S(T)]" is the magnitude of the signal S representing the temperature T. It is noted that the configuration of the beams 415.1, 415.2, 417.1, 417.2, 417.3, and 417.4 can be optimized to position the temperature sensing elements 415.1, 415.2, 417.1, 417.2, 417.3, 417.4 relative to the heater element 408 for reduced DC offset.

Figure 4F:
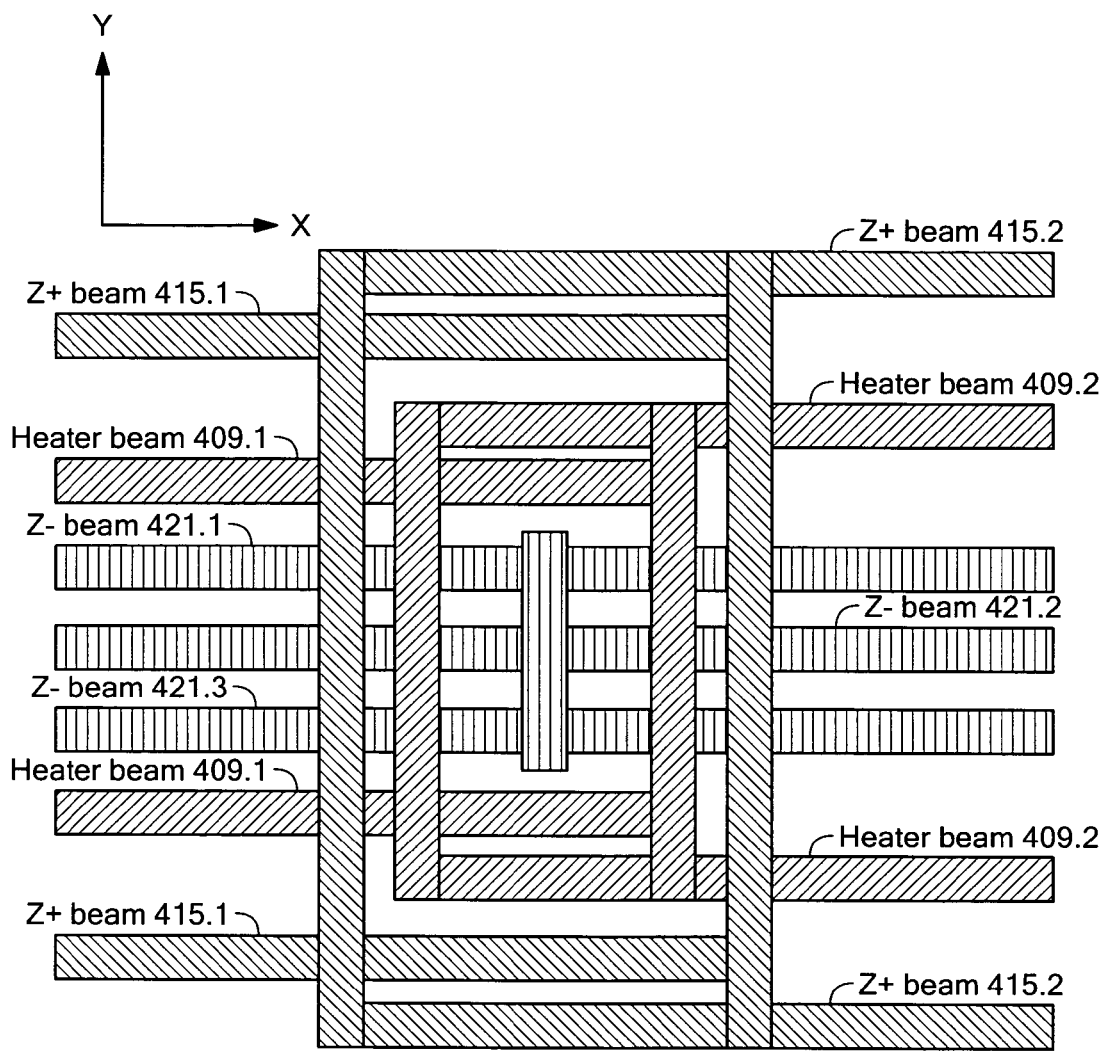
FIG. 4f is a plan view of a second illustrative embodiment of a bridge structure included in the single chip 3-axis thermal accelerometer device of FIG. 4a, the bridge structure being configured to position temperature sensing elements within the device out of the plane of the device substrate.
Figure 4G:
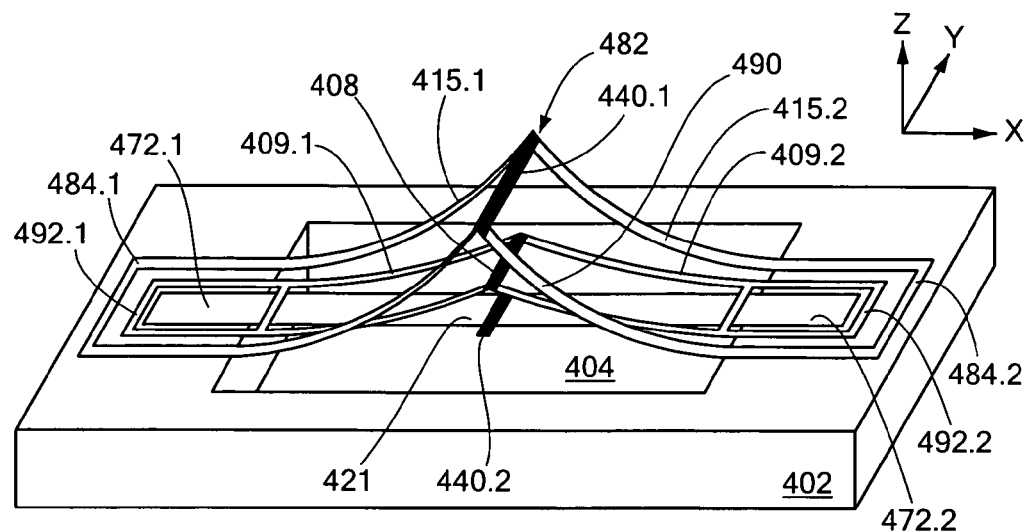
FIG. 4g is a perspective view of the bridge structure of FIG. 4f.

FIGS. 4f-4g depict a second illustrative configuration of the Z+beams 415.1-415.2 (see also FIG. 4b). In this second configuration, a temperature sensing element 440.1 is disposed at the coupling of the Z+beams 415.1-415.2, a temperature sensing element 440.2 is disposed on a Z− beam 421 (including Z− beams 421.1-421.3), and the heater element 408 is disposed at the coupling of beams 409.1-409.2. The Z+beams 415.1-415.2 and the heater beams 409.1-409.2 are configured to position the temperature sensing element 440.1 and the heater element 408, respectively, out of the X-Y plane substantially above the center of the cavity opening. As shown in FIG. 4g, the heater element 408 is positioned at substantially the mid-point of the distance between the temperature sensing element 440.1 (Z+) and the temperature sensing element 440.2 (Z−). It is noted that the Z-beams 421.1-421.3 and the temperature sensing element 440.2 disposed thereon are positioned in the X-Y plane.

Accordingly, the Z+beams 415.1-415.2 and the heater beams 409.1-409.2 are each formed with multiple layers of material, each layer having different stress characteristics, so that upon release from the substrate, the beams 415.1-415.2, 409.1-409.2 bend out of the X-Y plane (see FIG. 4g), thereby positioning the temperature sensing element 440.1 (Z+) and the heater element 408 out of the X-Y plane. The coupling of the Z+beams 415.1-415.2 and the coupling of the heater beams 409.1-409.2 form a secure micron mechanical-lock interference fit at the ends 482, 490 of the beams, respectively, when each set of beams is bent out of the X-Y plane. It is noted that the distal ends 484.1, 484.2 of the Z+beams 415.1-415.2, respectively, the distal ends 492.1, 492.2 of the heater beams 409.1-409.2, respectively, and the ends 472.1, 472.2 of the Z− beam 421 are fixedly attached to the surface of the substrate 402 in the X-Y plane.

To obtain an indication of the magnitude of acceleration along the Z-axis using the beam configuration of FIGS. 4f-4g, the temperatures T$_{1,Z+}$, T$_{2,Z-}$ detected by the temperature sensing elements 440.1 (Z+) and 440.2 (Z−), respectively, are determined. Next, signals S(T$_{1,Z+}$), S(T$_{2,Z-}$) (e.g., voltage signals) representing the temperatures T$_{1,Z+}$, T$_{2,Z-}$ are generated, and the magnitudes of the signals S(T$_{1,Z+}$), S(T$_{2,Z-}$) are determined. The magnitude of acceleration along the Z-axis can therefore be expressed as $$Z\text{-axis acceleration}=\text{mag}[S(T_{1,Z+})]-\text{mag}[S(T_{2,Z-})] \quad (13)$$

in which "mag[S(T)]" is the magnitude of the signal S representing the temperature T.

Figure 4H:
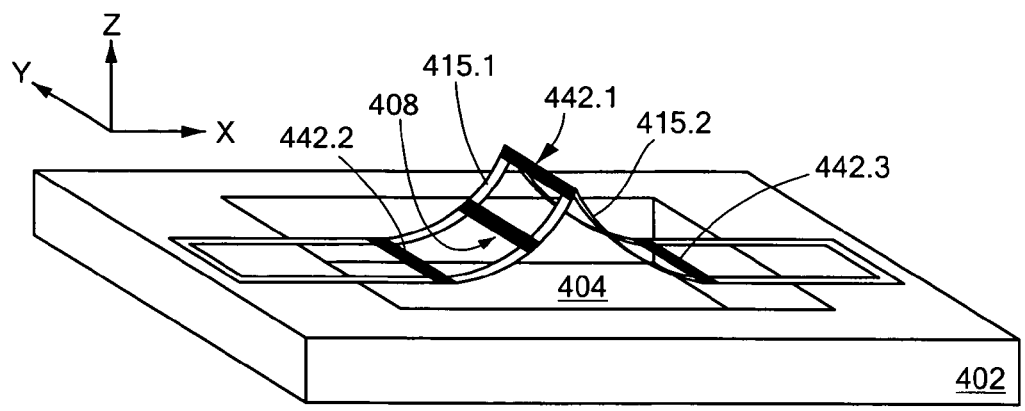
FIG. 4h is an alternative embodiment of the bridge structure of FIG. 4f.

FIG. 4h depicts a third illustrative configuration of the Z+beams 415.1-415.2 (see also FIG. 4b) that renders the need for providing separate beams to hold the heater element and the Z-temperature sensing elements unnecessary. As shown in FIG. 4h, a temperature sensing element 442.1 is disposed out of the X-Y plane at the coupling of the Z+ beams 415.1-415.2. In addition, temperature sensing elements 442.2 and 442.3 (Z−) are disposed on the Z+beams 415.1 and 415.2, respectively, substantially in the X-Y plane, and heater element 408 is disposed out of the X-Y plane on the Z+beam 415.1 substantially at the mid-point of the distance between the temperature sensing element 442.1 (Z+) and the temperature sensing element 442.2. In this third configuration, the magnitude of acceleration along the Z-axis can be expressed as indicated in equation (13) above.

Figure 5A:
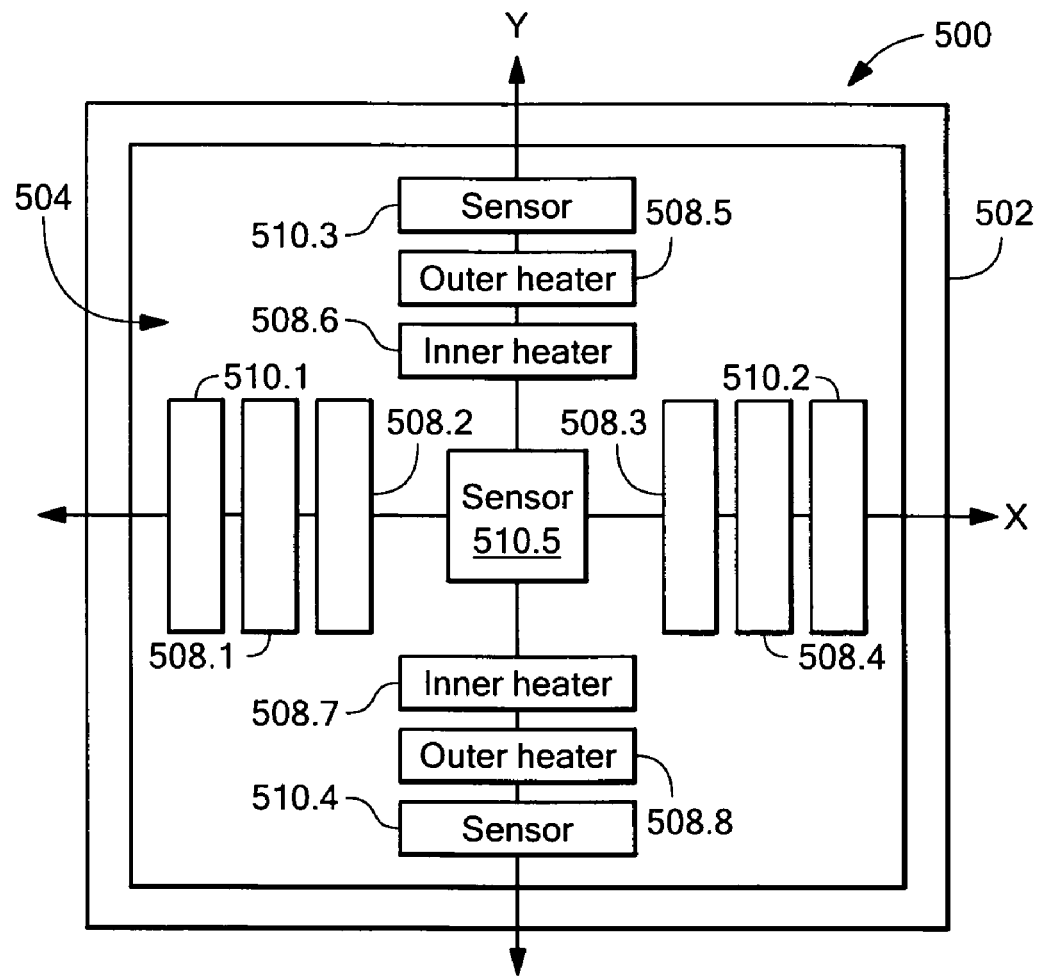
FIG. 5a is a plan view of a fourth embodiment of a single chip 3-axis thermal accelerometer device according to the present invention.
Figure 5B:
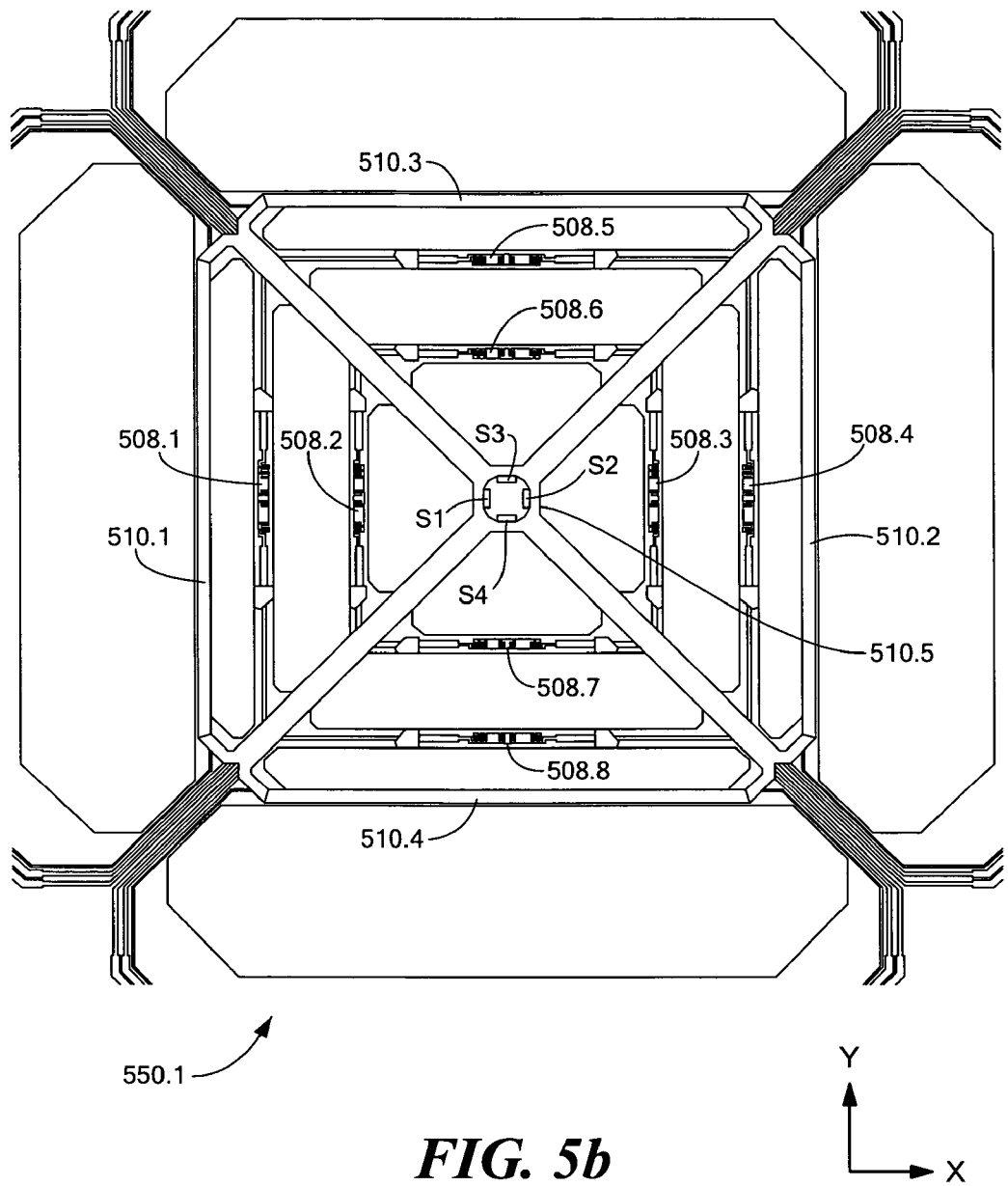
FIG. 5b is a detailed plan view of the single chip 3-axis thermal accelerometer device of FIG. 5a, showing an illustrative bridge structure.
Figure 5C:
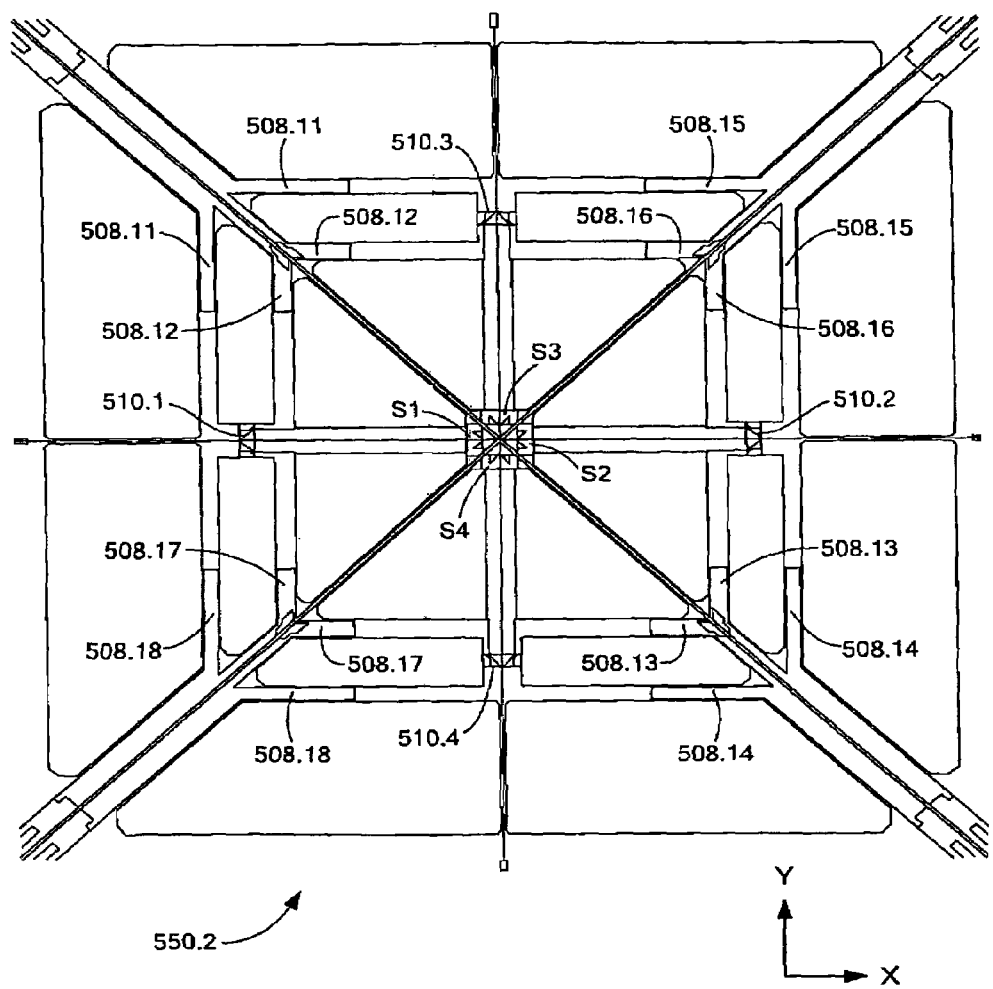
FIG. 5c is a detailed plan view of the single chip 3-axis thermal accelerometer device of FIG. 5a, showing an alternative embodiment of the bridge structure of FIG. 5b.

FIGS. 5a-5c depict a fourth illustrative embodiment of a single chip 3-axis thermal accelerometer device 500, in accordance with the present invention. In the illustrated embodiment, the thermal accelerometer device 500 includes a substrate 502, at least one cavity 504 having a cross-section of any suitable shape (e.g., square or rectangular) etched in the substrate 502, a fluid (not numbered) such as air disposed in the cavity 504, a bridge structure (see, e.g., bridge structures 550.1-550.2 of FIGS. 5b-5c, respectively) suspended over an opening (not numbered) of the cavity 504, and inner and outer heater elements 508.1-508.8 and a plurality of temperature sensing elements 510.1-510.5 disposed on the bridge structure. The plurality of temperature sensing elements 510.1-510.5 includes the temperature sensing elements 510.1-510.2 disposed along the X-axis on opposite sides of and at substantially equal distances from the center of the cavity 504, the temperature sensing elements 510.3-510.4 disposed along the Y-axis on opposite sides of and at substantially equal distances from the center of the cavity 504, and the temperature sensing element 510.5 disposed at substantially the center of the cavity 504. Further, the outer heater elements 508.1 and 508.4 are disposed along the X-axis on opposite sides of and at substantially equal distances from the center of the cavity 504, the outer heater elements 508.5 and 508.8 are disposed along the Y-axis on opposite sides of and at substantially equal distances from the center of the cavity 504, the inner heater elements 508.2-508.3 are disposed along the X-axis on opposite sides of and at substantially equal distances from the center of the cavity 504, and the inner heater elements 508.6-508.7 are disposed along the Y-axis on opposite sides of and at substantially equal distances from the center of the cavity 504. Like the thermal accelerometer devices 200, 300, and 400 (see FIGS. 2b, 3b, and 4b), a hermetically sealed package forms an outer boundary of a region above the cavity 504, and the fluid fills the cavity 504 and the region within the device.

FIG. 5b depicts the single chip 3-axis thermal accelerometer device 500 of FIG. 5a, illustrating the heater elements 508.1-508.8 and the temperature sensing elements 510.1-510.5 disposed on the bridge structure 550.1. In this illustrative embodiment, the temperature sensing element 510.5 disposed at substantially the center of the cavity 504 includes a plurality of temperature sensing elements S1-S4 disposed near the cavity center. Specifically, the temperature sensing elements S1-S2 are disposed along the X-axis on opposite sides of and at substantially equal distances from the center of the cavity 504, and the temperature sensing elements S3-S4 are disposed along the Y-axis on opposite sides of and at substantially equal distances from the center of the cavity 504. It is noted that the temperature sensing elements S1 and 510.1 are electrically connected through the suspended bridge structure 550.1 to form a first temperature sensing element pair (+X), the temperature sensing elements S2 and 510.2 are electrically connected through the suspended bridge structure 550.1 to form a second temperature sensing element pair (−X), the temperature sensing elements S3 and 510.3 are electrically connected through the suspended bridge structure 550.1 to form a third temperature sensing element pair (+Y), and the temperature sensing elements S4 and 510.4 are electrically connected through the suspended bridge structure 550.1 to form a fourth temperature sensing element pair (−Y). In this way, the power consumption of the heater elements 508.1-508.8 can be reduced, and the resistance of the temperature sensing elements 510.1-510.5 can be reduced. The temperature sensing element pairs +X and −X can be used to obtain an indication of the magnitude of acceleration along the X− axis, and the temperature sensing element pairs +Y and −Y can be used to obtain an indication of the magnitude of acceleration along the Y-axis. In addition, the temperature sensing element pairs +X, −X, +Y, −Y can be used to obtain an indication of the magnitude of acceleration along the Z-axis.

To obtain an indication of the magnitude of acceleration along the X-axis, the differential temperature $(T_{11}-T_{22})$ detected by the temperature sensing element pairs +X, −X, respectively, is determined. Next, a signal $S(T_{11}-T_{22})$ (e.g., a voltage signal) representing the differential temperature $(T_{11}-T_{22})$ is generated, and the magnitude of the signal $S(T_{11}-T_{22})$ is determined. The magnitude of acceleration along the X-axis can therefore be expressed as $$\text{X-axis acceleration} = \text{mag}[S(T_{11}-T_{22})], \tag{14}$$

in which "mag[S(ΔT)]" is the magnitude of the signal S representing the differential temperature ΔT.

To obtain an indication of the magnitude of acceleration along the Y-axis, the differential temperature $(T_{33}-T_{44})$ detected by the temperature sensing element pairs +Y, −Y, respectively, is determined. Next, a signal $S(T_{33}-T_{44})$ (e.g., a voltage signal) representing the differential temperature $T_{33}-T_{44}$ is generated, and the magnitude of the signal $S(T_{33}-T_{44})$ is determined. The magnitude of acceleration along the Y-axis can therefore be expressed as $$\text{Y-axis acceleration} = \text{mag}[S(T_{33}-T_{44})], \tag{15}$$

in which "mag[S(ΔT)]" is the magnitude of the signal S representing the differential temperature ΔT.

To obtain an indication of the magnitude of acceleration along the Z-axis, i.e., perpendicular to the X-Y plane, the temperatures $T_{11}$, $T_{22}$, $T_{33}$, $T_{44}$ detected by the temperature sensing element pairs +X, −X, +Y, and −Y, respectively, are determined. Next, signals $S(T_{11})$, $S(T_{22})$, $S(T_{33})$, and $S(T_{44})$ (e.g., voltage signals) representing the temperatures $T_{11}$, $T_{22}$, $T_{33}$, and $T_{44}$, respectively, are generated, and the magnitudes of the signals $S(T_{11})$, $S(T_{22})$, $S(T_{33})$, and $S(T_{44})$ are determined. The magnitude of acceleration along the Z-axis can therefore be expressed as $$\text{Z-axis acceleration} = \text{mag}[(S(T_{11})+S(T_{22})+S(T_{33})+S(T_{44})]. \tag{16}$$

It is noted that by setting different values of the powers of the inner heater elements 508.2-508.3, 508.6-508.7 and the outer heater elements 508.1, 508.4, 508.5, 508.8, the offset of temperature sensing elements 510.1-510.5 can be substantially eliminated, mainly through convection.

FIG. 5c depicts the single chip 3-axis thermal accelerometer device 500 of FIG. 5a, illustrating the heater elements 508.11, 508.12, 508.13, 508.14, 508.15, 508.16, 508.17, and 508.18, and the temperature sensing elements 510.1-510.5 disposed on the bridge structure 550.2. Like the illustrative embodiment of FIG. 5b, the temperature sensing element 510.5 of FIG. 5c is disposed at substantially the center of the cavity 504 and includes a plurality of temperature sensing elements S1-S4 disposed near the cavity center. In addition, the heater elements 508.11, 508.12, 508.13, 508.14 are disposed on a first 45° beam of the bridge structure 550.2, and the heater elements 508.15, 508.16, 508.17, 508.18 are disposed on a second 450 beam of the bridge structure 550.2. The temperature sensing elements S1 and 510.1 are electrically connected through a first beam along the X-axis to form a first temperature sensing element pair (+X), the temperature sensing elements S2 and 510.2 are electrically connected through a second beam along the X-axis to form a second temperature sensing element pair (−X), the temperature sensing elements S3 and 510.3 are electrically connected through a third beam along the Y-axis to form a third temperature sensing element pair (+Y), and the temperature sensing elements S4 and 510.4 are electrically connected through a fourth beam along the Y-axis to form a fourth temperature sensing element pair (−Y). In this way, the power consumption of the heater elements 508.11, 508.12, 508.13, 508.14, 508.15, 508.16, 508.17, 508.18 can be reduced, and the resistance of the temperature sensing elements 510.1-510.5 can be reduced. Indications of the magnitudes of acceleration along the X, Y, and Z-axes using the thermal accelerometer device of FIG. 5c can be obtained according to the expressions contained in equations (14), (15), and (16) above. By setting different values of the powers of the inner heater elements 508.12, 508.13, 508.16, 508.17 and the outer heater elements 508.11, 508.14, 508.15, 508.18, the offset of the temperature sensing elements 510.1-510.5 can be substantially eliminated, mainly through thermal conduction of the solid beams.

It is noted that the voltage signals generated in the determination of the magnitudes of acceleration along the X, Y, and Z-axes, as described above, may be processed using circuitry like that described in co-pending U.S. patent application Ser. No. 11/125,759 filed May 10, 2005 entitled Z-AXIS THERMAL ACCELEROMETER (the '759 application), which is incorporated herein by reference.

It will be appreciated by those of ordinary skill in the art that further modifications to and variations of the above-described single chip tri-axis accelerometer may be made without departing from the inventive concepts disclosed herein. Accordingly, the invention should not be viewed as limited except as by the scope and spirit of the appended claims.

What is claimed is:

1. A 3-axis thermal accelerometer, the thermal accelerometer being operable for sensing acceleration along X-, Y-, and Z-axes defining an X-Y-Z Cartesian coordinate system, the 3-axis thermal accelerometer comprising:
    a substrate having a substantially planar surface defined by the X- and Y-axes;
    at least one cavity formed in the substrate, the cavity having an opening in the X-Y plane, the X- and Y-axes extending radially from a center of the cavity opening;
    a fluid disposed in the cavity;
    a plurality of first heater elements; and
    a plurality of temperature sensing elements,
    wherein the plurality of first heater elements and the plurality of temperature sensing elements are arranged in a plurality of groups of elements suspended over the cavity in the X-Y plane, each group of elements including at least two temperature sensing elements and at least one first heater element, the two temperature sensing elements within each group being disposed on opposite sides of and at substantially equal distances from the first heater element within the group,
    wherein the plurality of groups of first heater elements and temperature sensing elements includes first and second groups of elements disposed along the X-axis, and third and fourth groups of elements disposed along the Y-axis, the first and second groups of elements and the third and fourth groups of elements being disposed along the X- and Y-axes, respectively, on opposite sides of and at substantially equal distances from the center of the cavity opening, and
    wherein, in response to acceleration applied along the Z-axis, the temperature sensing elements within the first and second groups of elements are operative to detect first and second differential temperatures, respectively, the first and second differential temperatures being detected in opposing directions along the X-axis, the temperature sensing elements within the third and fourth groups of elements are operative to detect third and fourth differential temperatures, respectively, the third and fourth differential temperatures being detected in opposing directions along the Y-axis, the sum of the first, second, third, and fourth differential temperatures being indicative of the applied acceleration along the Z-axis.

2. The 3-axis thermal accelerometer of claim 1 wherein the temperature sensing elements within the first and second groups of elements are operative to detect first and second differential temperatures, respectively, in response to acceleration applied along the X-axis, the sum of the first and second differential temperatures being indicative of the applied acceleration along the X-axis.

3. The 3-axis thermal accelerometer of claim 1 wherein the temperature sensing elements within the third and fourth groups of elements are operative to detect third and fourth differential temperatures, respectively, in response to acceleration applied along the Y-axis, the sum of the third and fourth differential temperatures being indicative of the applied acceleration along the Y-axis.

4. The 3-axis thermal accelerometer of claim 1 further including a sealed package, wherein the substrate, the fluid, the plurality of first heater elements, and the plurality of temperature sensing elements are disposed in the sealed package.

5. The 3-axis thermal accelerometer of claim 4 wherein the sealed package is configured to define a first spatial region bordering the substrate and external to the cavity, the fluid being disposed in the cavity and the first spatial region, and wherein the volume of the first spatial region is greater than the volume of the cavity.

6. The 3-axis thermal accelerometer of claim 1 further including a second heater element suspended over the cavity in the X-Y plane at substantially the center of the cavity opening.

7. The 3-axis thermal accelerometer of claim 1 further including a bridge structure configured to suspend the heater element and the plurality of temperature sensing elements over the cavity,
    wherein a fifth one of the temperature sensing elements within the first group of elements a sixth one of the temperature sensing elements within the second group of elements, a seventh one of the temperature sensing elements within the third group of elements, and an eighth one of the temperature sensing elements within the fourth group of elements are each operative to detect a respective temperature,
    wherein the fifth and sixth ones of the temperature sensing elements are disposed along the X-axis on opposite sides of and at substantially equal distances from the heater element, and are connected to the bridge structure via respective first reduced thermal conductivity bridges, and
    wherein the seventh and eighth ones of the temperature sensing elements are disposed along the Y-axis, on opposite sides of and at substantially equal distances from the heater element, and are connected to the bridge structure via respective second reduced thermal conductivity bridges.

8. The 3-axis thermal accelerometer of claim 7 wherein each of the fifth, sixth, seventh, and eighth temperature sensing elements is formed in two halves.

9. The 3-axis thermal accelerometer of claim 7
wherein a ninth one of the temperature sensing elements within the first group of elements, a tenth one of the temperature sensing elements within the second group of elements, an eleventh one of the temperature sensing elements within the third group of elements, and a twelfth one of the temperature sensing elements within the group fourth of elements are each operative to detect a respective temperature,
wherein the ninth and tenth ones of the temperature sensing elements are disposed out of the X-Y plane along a line parallel to the X-axis on opposite sides of and at substantially equal distances from the heater element, and
wherein the eleventh and twelfth ones of the temperature sensing elements are disposed out of the X-Y plane along a line parallel to the Y-axis on opposite sides of and at substantially equal distances from the heater element.

10. The 3-axis thermal accelerometer of claim 9 wherein the value of the difference between the sum of the respective temperatures detected by the ninth, tenth, eleventh, and twelfth ones of the temperature sensing elements and the sum of the respective temperatures detected by the fifth, sixth, seventh, and eighth ones of the temperature sensing elements is indicative of the applied acceleration along the Z-axis.

11. The 3-axis thermal accelerometer of claim 9
wherein each of the fifth, sixth, seventh, and eighth temperature sensing elements is formed in two halves,
wherein the ninth temperature sensing element is disposed between the two halves of the fifth temperature sensing element along the X-axis,
wherein the tenth temperature sensing element is disposed between the two halves of the sixth temperature sensing element along the X-axis,
wherein the eleventh temperature sensing element is disposed between the two halves of the seventh temperature sensing element along Y-axis, and
wherein the twelfth temperature sensing element is disposed between the two halves of the eighth temperature sensing element along Y-axis.

12. A 3-axis thermal accelerometer, the thermal accelerometer being operable for sensing acceleration along X-, Y-, and Z-axes defining an X-Y-Z Cartesian coordinate system, the 3-axis thermal accelerometer comprising:
a substrate having a substantially planar surface defined by the X- and Y-axes,
at least one cavity formed in the substrate, the cavity having an opening in the X-Y plane the X- and Y-axes extending radially from a center of the cavity opening;
a fluid disposed in the cavity;
at least one heater element; and
a plurality of temperature sensing elements,
wherein the heater element is suspended over the cavity in the X-Y plane substantially at the center of the cavity opening,
wherein the plurality of temperature sensing elements is arranged in a plurality of groups of elements suspended over the cavity, each group of elements including at least two temperature sensing elements,
wherein the plurality of groups of temperature sensing elements includes first and second groups of elements disposed along the X-axis, and third and fourth groups of elements disposed along the Y-axis, the first and second groups of elements and the third and fourth groups of elements being disposed along the X- and Y-axes, respectively, opposite sides of and at substantially equal distances from the heater element,
wherein a first one of the temperature sensing elements, within the first group of elements, a second one of the temperature sensing elements within the second group of elements, a third one of the temperature sensing elements within the third group of elements, and a fourth one of the temperature sensing elements within the fourth group of elements, are operative to detect a common mode temperature, the first and second ones of the temperature sensing elements being disposed along the X-axis and the third and fourth ones of the temperature sensing elements being disposed along the Y-axis on opposite sides of and at substantially equal distances from the heater element, the common mode temperature being indicative of the applied acceleration along the Z-axis, and
wherein a fifth one of the temperature sensing elements within the first group of elements, a sixth one of the temperature sensing elements within the second group of elements, a seventh one of the temperature sensing elements within the third group of elements, and an eighth one of the temperature sensing elements within the fourth group of elements are each operative to detect a respective temperature, the fifth and sixth ones of the temperature sensing elements being disposed along the X-axis and the seventh and eighth ones of the temperature sensing elements being disposed along the Y-axis on opposite sides of and at substantially equal distances from the heater element, and wherein the value of the quotient obtained by dividing the sum of the respective temperatures detected by the fifth, sixth, seventh, and eighth ones of the temperature sensing elements by the sum of the respective temperatures detected by the first, second, third, and fourth ones of the temperature sensing elements is indicative of the applied acceleration along the Z-axis.

13. The 3-axis thermal accelerometer of claim 12 wherein a first one of the temperature sensing elements within the first group of elements, and a second one of the temperature sensing elements within the second group of elements, are operative to detect a first differential temperature in response to acceleration applied along the X-axis, the first and second ones of the temperature sensing elements being disposed along the X axis on opposite sides of and at substantially equal distances from the heater element, the first differential temperature being indicative of the applied acceleration along the X-axis.

14. The 3-axis thermal accelerometer of claim 12 wherein a third one of the temperature sensing elements within the third group of elements, and a fourth one of the temperature sensing elements within the fourth group of elements, are operative to detect a second differential temperature in response to acceleration applied along the Y-axis, the third and fourth ones of the temperature sensing elements being disposed along the Y axis on opposite sides of and at substantially equal distances from the heater element, the second differential temperature being indicative of the applied acceleration along the Y-axis.

15. The 3-axis thermal accelerometer of claim 12 further including a sealed package, wherein the substrate, the fluid, the heater element, and the plurality of temperature sensing elements are disposed in the sealed package.

16. The 3-axis the thermal accelerometer of claim 15 wherein the sealed package is configured to define a first spatial region bordering the substrate and external to the cavity, the fluid being disposed in the cavity and the first spatial region, and wherein the volume of the first spatial region is greater than the volume of the cavity.

17. A 3-axis thermal accelerometer, the thermal accelerometer being operable for sensing acceleration along X, Y, and Z-axes defining an X-Y-Z Cartesian coordinate system, the 3-axis thermal accelerometer comprising:
a substrate having a substantially planar surface defined by the X and Y-axes,
at least one cavity formed in the substrate, the cavity having an opening in the X-Y plane, the X and Y-axes extending radially from a center of the cavity opening;
a fluid disposed in the cavity;
at least one heater element; and
a plurality of temperature sensing elements,
wherein the heater element is suspended over the cavity out of the X-Y plane,
wherein at least one first one and at least one second one of the plurality of temperature sensing elements are suspended over the cavity, at least one of the first and second temperature sensing elements being suspended over the cavity out of the X-Y plane, and
wherein the first and second temperature sensing elements are disposed substantially along the Z-axis on opposite sides of and at substantially equal distances from the heater element.

18. The 3-axis thermal accelerometer of claim 17 wherein the value of the difference between the respective temperatures detected by the first and second temperature sensing elements is indicative of the applied acceleration along the Z-axis.

19. A 3-axis thermal accelerometer, the thermal accelerometer being operable for sensing acceleration along X, Y, and Z-axes defining an X-Y-Z Cartesian coordinate system, the 3-axis thermal accelerometer comprising:
a substrate having a substantially planar surface defined by the X and Y-axes;
at least one cavity formed in the substrate, the cavity having an opening in the X-Y plane, the X and Y-axes extending radially from a center of the cavity opening;
a fluid disposed in the cavity opening;
a plurality of heater elements; and
a first temperature sensing element and a plurality of second temperature sensing elements,
wherein the first temperature sensing element is disposed at substantially the center of the cavity opening,
wherein the plurality of second temperature sensing elements and the plurality of heater elements are arranged in a plurality of groups of elements suspended over the cavity in the X-Y plane, each group of elements including at least one second temperature sensing element and at least two heater elements, the two heater elements within each group being disposed between the first temperature sensing element and the second temperature sensing element within the group, and
wherein the plurality of groups of second temperature sensing elements and heater elements inludes first and second groups of elements disposed along the X-axis, and third and fourth groups of elements disposed along the Y-axis, the first and second groups of elements and the third and fourth groups of elements being disposed along the X and Y-axes, respectively, on opposite sides of and at substantially equal distances from the center of the cavity opening.

20. The 3-axis thermal accelerometer of claim 19 wherein the two heater elements within each group include a first heater element and a second heater element, the first heater element being disposed closer to the first temperature sensing element than the second heater element.

21. The 3-axis thermal accelerometer of claim 20 wherein each of the first and second heater elements has a power level associated therewith, the power level of the first heater element being different from the power level of the second heater element to reduce an offset associated with the first and second temperature sensing elements.

22. The 3-axis the thermal accelerometer of claim 19 wherein the first temperature sensing element includes third and fourth temperature sensing elemets disposed along the X-axis on opposite sides of and at substantially equal distances from the center of the cavity opening, and fifth and sixth temperature sensing elements disposed along the Y-axis on opposite sides of and at substantially equal distances from the center of the cavity opening.

23. The 3-axis the thermal accelerometer of claim 22 wherein the third temperature sensing element is electrically connected to the second temperature sensing element within the first group of elements, the third temperature sensing element and the first group of elements being disposed on the same side of the center of the cavity opening, wherein the fourth temperature sensing element is electrically connected to the second temperature sensing element within the second group of elements, the fourth temperature sensing element and the second group of elements being disposed on the same side of the center of the cavity opening, wherein the fifth temperature sensing element is electrically connected to the second temperature sensing element within the third group of elements, the fifth temperature sensing element and the third group of elements being disposed on the same side of the center of the cavity opening, and wherein the sixth temperature sensing element is electrically connected to the second temperature sensing element within the fourth group of elements, the sixth temperature sensing element and the fourth group of elements being disposed on the same side of the center of the cavity opening.

24. A 3-axis thermal accelerometer, the thermal accelerometer being operable for sensing acceleration along X, Y, and Z-axes defining an X-Y-Z Cartesian coordinate system, the 3-axis thermal accelerometer comprising:
a substrate having a substantially planar surface defined by the X and Y-axes;
at least one cavity formed in the substrate, the cavity having an opening in the X-Y plane, the X and Y-axes extending radially from a center of the cavity opening;
a fluid disposed in the cavity;
a plurality of heater elements; and
a first temperature sensing element and a plurality of second temperature sensing elements,
wherein the first temperature sensing element is disposed at substantially the center of the cavity opening,
wherein the plurality of second temperature sensing elements includes a first pair of second temperature sensing elements disposed along the X-axis on opposite sides of and at substantially equal distances from the center of the cavity opening, and a second pair of second temperature sensing elements disposed along the Y-axis on opposite sides of and at substantially equal distances from the center of the cavity opening, and
wherein the plurality of heater elements is arranged in a plurality of groups of heater elements, each group of heater elements including a first heater element and a second heater element, the first heater element within each group being disposed between the first temperature sensing element and the second heater element within the group, and wherein the plurality of groups of heater elements includes first and second groups of heater elements disposed along a first axis in the X-Y plane disposed at approximately a 45° angle to the X and Y-axes, and third and fourth groups of heater elements disposed along a second axis in the X-Y plane orthogonal to the first axis.

25. The 3-axis thermal accelerometer of claim 24 wherein each of the first and second heater elements has a power level associated therewith, the power level of the first heater element being different from the power level of the second heater element to reduce an offset associated with the first and second temperature sensing elements.

26. The 3-axis thermal accelerometer of claim 24 wherein the first temperature sensing element includes third and fourth temperature sensing elements disposed along the X-axis on opposite sides of and at substantially equal distances from the center of the cavity opening, and fifth and sixth temperature sensing elements disposed along the Y-axis on opposite sides of and at substantially equal distances from the center of the cavity opening.

27. The 3-axis thermal accelerometer of claim 26 wherein the third temperature sensing element is electrically connected to a respective second temperature sensing element within the first pair of elements disposed on the same side of the center of the cavity opening as the third temperature sensing element, wherein the fourth temperature sensing element is electrically connected to a respective second temperature sensing element within the first pair of elements disposed on the same side of the center of the cavity opening as the fourth temperature sensing element, wherein the fifth temperature sensing element is electrically connected to a respective second temperature sensing element within the second pair of elements disposed on the same side of the center of the cavity opening as the fifth temperature sensing element, and wherein the sixth temperature sensing element is electrically connected to a respective second temperature sensing element within the second pair of elements disposed on the same side of the center of the cavity opening as the sixth temperature sensing element.

28. A 3-axis thermal accelerometer, the thermal accelerometer being operable for sensing acceleration along X-, Y- and Z-axes defining an X-Y-Z Cartesian coordinate system, the 3-axis thermal accelerometer comprising:

a substrate having a substantially planar surface defined by the X- and Y-axes, at least one cavity formed in the substrate, the cavity having an opening in the X-Y plane, the X- and Y-axes extending radially from a center of the cavity opening;

a fluid disposed in the cavity;

at least one heater element;

a plurality of temperature sensing elements; and a bridge structure configured to suspend the heater element and the plurality of temperature sensing elements over the cavity in the X-Y plane substantially at the center of the cavity opening, wherein the plurality of temperature sensing elements is arranged in a plurality of groups of elements suspended over the cavity, each group of elements including at least two temperature sensing elements, wherein the plurality of groups of temperature sensing elements includes first and second groups of elements disposed along the X-axis, and third and fourth groups of elements disposed along the Y-axis, the first and second groups of elements and the third and fourth groups of elements being disposed along the X- and Y-axes, respectively, on opposite sides of and at substantially equal distances from the heater element, the bridge structure being further configured to suspend a respective one of the temperature sensing elements within each of the first, second, third, and fourth groups of elements over the cavity and out of the X-Y plane.

29. The 3-axis thermal accelerometer of claim 28 wherein the respective one of the temperature sensing elements within each of the first, second, third, and fourth groups of elements suspended over the cavity out of the X-Y plane is disposed closer to the heater element than the other one of the temperature sensing elements within the group of elements.

30. The 3-axis thermal accelerometer of claim 28 wherein the bridge structure includes a plurality of beams configured to suspend the respective temperature sensing elements within each of the first, second, third, and fourth groups of elements over the cavity and out of the X-Y plane, each of the plurality of beams being formed with multiple layers of material, and wherein at least two of the multiple material layers forming each beam have different, stress characteristics, thereby causing each beam to bend out of the X-Y plane when the beam is released from the substrate during fabrication.

31. The 3-axis thermal accelerometer of claim 30 wherein the multiple material layers forming each beam include at least one first layer having compressive stress characteristics, and at least one second layer having tensile stress characteristics.

32. The 3-axis thermal accelerometer of claim 31 wherein the at least one first layer having compressive stress characteristics is selected from the group consisting of thermal growth Silicon Oxide, CVD Silicon Oxide, and Silicon Nitride layers.

33. The 3-axis thermal accelerometer of claim 31 wherein the at least one second layer having tensile stress characteristics is selected from the group consisting of metal and poly-silicon/poly-silicide layers.

* * * * *

UNITED STATES PATENT AND TRADEMARK OFFICE
CERTIFICATE OF CORRECTION

PATENT NO. : 7,424,826 B2
APPLICATION NO. : 11/271035
DATED : September 16, 2008
INVENTOR(S) : Yaping Hua et al.

It is certified that error appears in the above-identified patent and that said Letters Patent is hereby corrected as shown below:

Column 1, line 58, "be-desirable" should be --be desirable--;

Column 13, line 62, "respectively. 410.2c" should be --respectively. Further, the temperature sensing elements 410.2a (2+) and 410.2b...--;

Column 14, lines 50-51, "$T_{3a}$, $T_{6a}$, $T_{7a}$, $T_{2bc}$, $T_{3bc}$, and $T_{7bc}$ detect" should be --$T_{3a}$, $T_{6a}$, $T_{7a}$, $T_{2bc}$, $T_{3bc}$, and $T_{7bc}$ detected by--;

Column 15, line 6, "}mag" should be
--$(T_{3a})$ -S $(T_{3bc})$ }+mag{S $(T_{6a})$ -S $(T_{6bc})$ }+mag{S--;

Column 19, line 2, "450" should be --45°--;

Column 20, line 52, claim 7, "elements a" should be --elements, a--;

Column 20, line 66, claim 7, "axis, on" should be --axis on--;

Column 21, line 14, claim 9, "group fourth" should be --fourth group--;

Column 22, line 6, claim 12, "elements," should be --elements--;

Column 23, line 1, claim 16, delete "the";

Column 24, line 12, claim 22, delete "the"; and

UNITED STATES PATENT AND TRADEMARK OFFICE
CERTIFICATE OF CORRECTION

PATENT NO. : 7,424,826 B2
APPLICATION NO. : 11/271035
DATED : September 16, 2008
INVENTOR(S) : Yaping Hua et al.

It is certified that error appears in the above-identified patent and that said Letters Patent is hereby corrected as shown below:

Column 24, line 20, claim 23, delete "the".

Signed and Sealed this

Twenty-first Day of July, 2009

JOHN DOLL
*Acting Director of the United States Patent and Trademark Office*